(12) United States Patent
You et al.

(10) Patent No.: US 8,996,080 B2
(45) Date of Patent: *Mar. 31, 2015

(54) RADIO-FREQUENCY DEVICE AND WIRELESS COMMUNICATION DEVICE

(71) Applicant: Wistron NeWeb Corporation, Hsinchu (TW)

(72) Inventors: Shang-Sian You, Hsinchu (TW); Kuan-Hsueh Tseng, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 37 days.

This patent is subject to a terminal disclaimer.

(21) Appl. No.: 13/964,115

(22) Filed: Aug. 12, 2013

(65) Prior Publication Data
US 2014/0315606 A1    Oct. 23, 2014

(30) Foreign Application Priority Data
Apr. 19, 2013   (TW) .............................. 102113979 A

(51) Int. Cl.
| | | |
|---|---|---|
| H01Q 1/24 | (2006.01) | |
| H01Q 7/00 | (2006.01) | |
| H01Q 9/16 | (2006.01) | |
| H01Q 9/26 | (2006.01) | |
| H01Q 9/42 | (2006.01) | |

(52) U.S. Cl.
CPC ............ *H04B 1/3838* (2013.01); *H01Q 1/245* (2013.01); *H01Q 7/00* (2013.01); *H01Q 9/16* (2013.01); *H01Q 9/26* (2013.01); *H01Q 9/42* (2013.01)

USPC ........ 455/575.5; 343/850; 343/852; 343/845; 343/846; 307/104; 307/98; 307/109; 455/121; 455/193.1; 455/197.2; 455/197.3

(58) Field of Classification Search
CPC ......... H01B 1/3838; H01Q 9/42; H01Q 1/245
USPC ......... 455/121, 193.1, 197.2, 197.3; 343/850, 343/852, 845, 846; 307/104, 98, 109
See application file for complete search history.

(56) References Cited

U.S. PATENT DOCUMENTS

| | | | | |
|---|---|---|---|---|
| 2006/0281423 A1* | 12/2006 | Caimi et al. | .................. | 455/129 |
| 2013/0120200 A1* | 5/2013 | Desclos et al. | ................ | 343/745 |
| 2013/0154894 A1* | 6/2013 | Caimi et al. | .................. | 343/858 |

* cited by examiner

*Primary Examiner* — Khalid Shaheed
(74) *Attorney, Agent, or Firm* — Winston Hsu; Scott Margo

(57) ABSTRACT

A radio-frequency (RF) device for a wireless communication device includes a grounding element, an antenna, a first DC blocking element for cutting off a direct-current (dc) signal route between a grounding terminal of the antenna and the grounding element, a capacitive sensing unit capable of using a radiating element of the antenna to sense an environment capacitance within a specific range, a second DC blocking element electrically connected between the radiating element and the feed-in element for blocking a dc signal path from the radiating element to the feed-in element, and a high-frequency blocking element electrically connected between the radiating element and the capacitive sensing unit for blocking a high-frequency signal path from the radiating element to the capacitive sensing unit.

18 Claims, 19 Drawing Sheets

RADIO-FREQUENCY DEVICE AND WIRELESS COMMUNICATION DEVICE

BACKGROUND OF THE INVENTION

1. Field of the Invention

The present invention relates to a radio-frequency (RF) device and wireless communication device, and more particularly, to an RF device and wireless communication device capable of maintaining radiating efficiency as well as reducing dimensions and increasing a sensing distance of the RF device.

2. Description of the Prior Art

A wireless communication device is equipped with an antenna to emit or receive radio waves, so as to exchange radio-frequency (RF) signals and access a wireless communication system. Since radio waves are high-frequency sinusoidal signals, every country in the world standardizes the power of radio waves mainly for preventing from affecting users and/or interfering operations of other wireless communication devices. For example, the International Commission on Non-Ionizing Radiation Protection (ICNIRP) recommends that the value of Specific Absorption Rate (SAR) shall not exceed 2.0 W/Kg, while the Federal Communications Commission (FCC) recommends that the value of SAR shall not exceed 1.6 W/Kg. SAR is a measure of the amount of radio frequency energy absorbed by the living body in a normal electromagnetic radiation environment, and watts per kilogram (W/Kg) is the unit of SAR. Besides, since different communication products are used under different conditions, a distance factor is further taken into consideration when measuring the value of SAR. For example, according to the general regulation, measurement of SAR for a handset wireless communication device such as a mobile device or a smart phone should be taken under a condition that the distance between the handset wireless communication device and a human body is 20 cm.

As well known to those skilled in the art, antenna efficiency is usually affected if attempting to reduce interferences of the wireless communication device itself to the outside environment (i.e. to reduce SAR value of the wireless communication device). Therefore, many methods have been disclosed in the prior art in order to maintain the antenna efficiency. One method is by using a proximity sensor to detect the approach of a human body. That is, the RF power of the wireless communication device is reduced when the proximity sensor detects that a human body is approaching, whereas the RF power of the wireless communication device is kept or moderately increased when the proximity sensor does not detect the approach of any human body. In such a condition, interference can be reduced, and meanwhile, antenna efficiency is kept. In the prior art, the proximity sensor includes a receiver or sensor which contains metal materials to detect capacitance variation, so as to determine whether a human body is approaching. However, the included receiver or sensor affects the antenna efficiency, and therefore, additional cost is required to adjust the antenna. Thus, it is a common goal in the industry to design an antenna which complies with the regulations for the SAR value and maintains the antenna efficiency as well.

SUMMARY OF THE INVENTION

The present invention therefore provides a radio-frequency (RF) device and wireless communication device having small size and low interference to the outside environment, and also maintaining the antenna efficiency.

An embodiment of the present invention discloses an RF device for a wireless communication system. The RF device includes a grounding unit for providing grounding; an antenna, including a radiating element, a signal feed-in unit for transmitting an RF signal to the radiating element in order to emit the RF signal via the radiating element, and a ground terminal coupled to the grounding unit; a capacitive sensing unit for sensing an environment capacitance within a specific range via the radiating element; a first direct-current (DC) blocking element, electrically connected between the ground terminal of the antenna and the grounding unit for cutting off a direct-current signal route from the ground terminal to the grounding unit; a second DC blocking element, electrically connected between the radiating element and the signal feed-in unit for cutting off a direct-current signal route from the radiating element to the signal feed-in unit; and a high-frequency blocking element, electrically connected between the radiating element and the capacitive sensing unit for cutting off a high-frequency signal route from the radiating element to the capacitive sensing unit.

An embodiment of the present invention further discloses a wireless communication device including an RF signal processing device for generating an RF signal and adjusting power of the RF signal according to a sensing result; and an RF device. The RF device includes a grounding unit for providing grounding; an antenna, including a radiating element, a signal feed-in unit for transmitting the RF signal to the radiating element in order to emit the RF signal via the radiating element, and a ground terminal coupled to the grounding unit; a capacitive sensing unit for sensing an environment capacitance within a specific range via the radiating element; a first DC blocking element, electrically connected between the ground terminal of the antenna and the grounding unit for cutting off a direct-current signal route from the ground terminal to the grounding unit; a second DC blocking element, electrically connected between the radiating element and the signal feed-in unit for cutting off a direct-current signal route from the radiating element to the signal feed-in unit; and a high-frequency blocking element, electrically connected between the radiating element and the capacitive sensing unit for cutting off a high-frequency signal route from the radiating element to the capacitive sensing unit.

An embodiment of the present invention further discloses an RF device for a wireless communication device. The RF device includes an antenna, including a radiating element and a signal feed-in unit for transmitting an RF signal to the radiating element in order to emit the RF signal via the radiating element; a capacitive sensing unit for sensing an environment capacitance within a specific range via the radiating element; a DC blocking element, electrically connected between the radiating element and the signal feed-in unit for cutting off a direct-current signal route from the radiating element to the signal feed-in unit; and a high-frequency blocking element, electrically connected between the radiating element and the capacitive sensing unit for cutting off a high-frequency signal route from the radiating element to the capacitive sensing unit; wherein the signal feed-in unit or the capacitive sensing unit cuts off a direct-current signal route from the radiating element to a ground terminal.

An embodiment of the present invention further discloses a wireless communication device including a radio-frequency (RF) signal processing device for generating an RF signal and adjusting power of the RF signal according to a sensing result; and an RF device. The RF device includes an antenna, including a radiating element and a signal feed-in unit for transmitting the RF signal to the radiating element in order to emit the RF signal via the radiating element; a capacitive sensing unit for sensing an environment capacitance within a specific range via the radiating element to generate the sensing result; a DC blocking element, electrically connected between the radiating element and the signal feed-in unit for cutting off a direct-current signal route from the radiating element to the signal feed-in unit; and a high-frequency blocking element, electrically connected between the radiating element and the capacitive sensing unit, for cutting off a high-frequency signal route from the radiating element to the capacitive sensing unit; wherein the signal feed-in unit or the capacitive sensing unit cuts off a direct-current signal route from the radiating element to a ground terminal.

These and other objectives of the present invention will no doubt become obvious to those of ordinary skill in the art after reading the following detailed description of the preferred embodiment that is illustrated in the various figures and drawings.

DETAILED DESCRIPTION

In order to reduce interferences and maintain antenna efficiency of a wireless communication device, the present invention utilizes radiating elements of an antenna to sense an environment capacitance within a specific range, and adjusts the power of RF signals accordingly, which therefore saves the space required for disposing a capacitive sensing unit. Moreover, the designer can only design a single antenna for different communication systems having similar frequency bands, hence design and manufacturing costs may be reduced and device components may be easily managed. Furthermore, the present invention utilizes a direct-current (dc) blocking element and a high-frequency blocking element to increase an effective sensing area and a sensing distance of the sensing unit as well as decrease the impact of the sensing unit on the antenna efficiency. To clearly describe the concept of the present invention, the embodiments of the present invention described hereinafter are divided into two categories according to antenna type.

Figure 1:
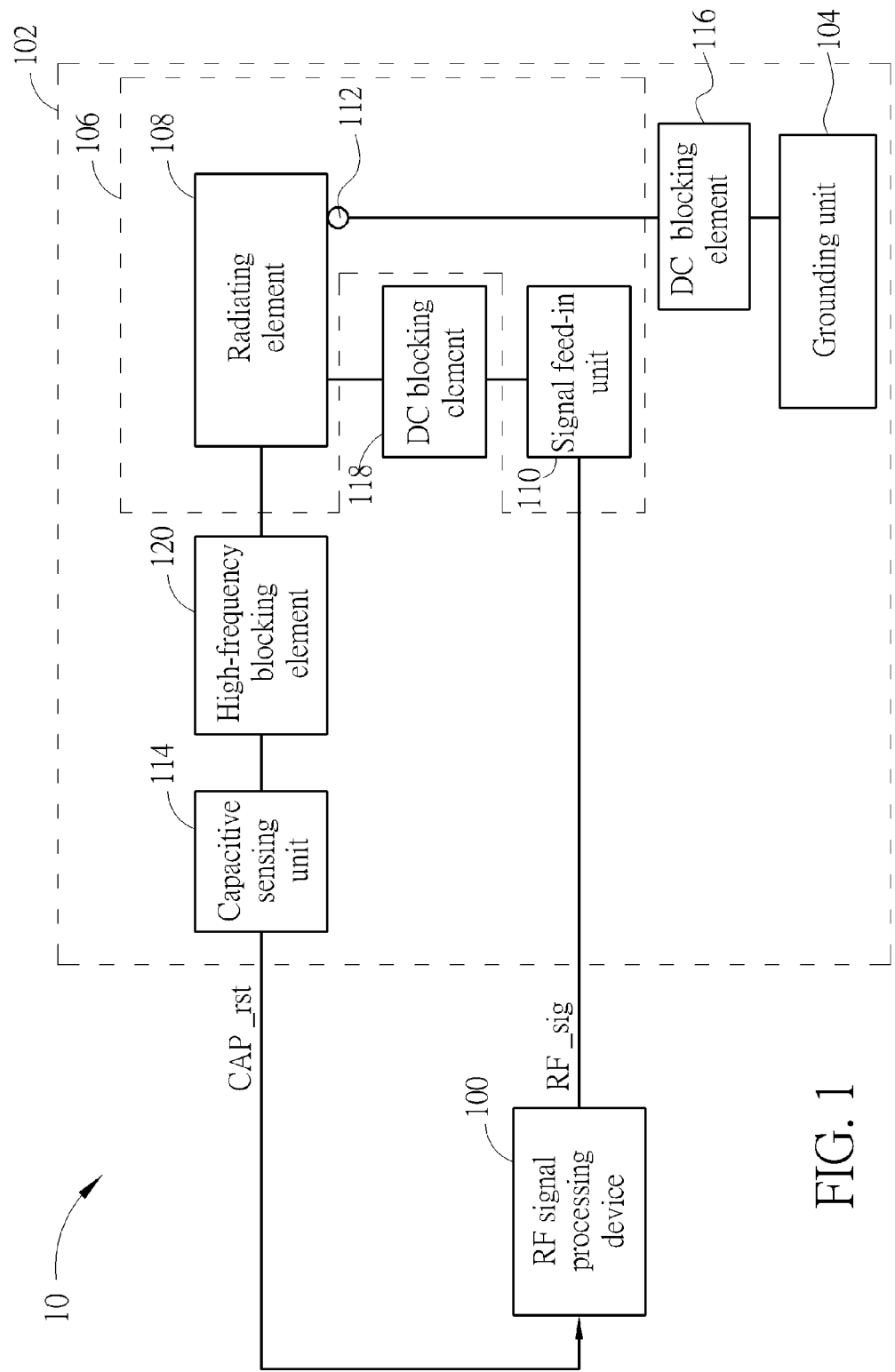
FIG. 1 is a schematic diagram of a wireless communication device according to an embodiment of the present invention.

First, for antennas including direct-current (dc) connecting path (i.e., dc signal route) between a radiating element and a ground terminal, please refer to FIG. 1, which is a schematic diagram of a wireless communication device 10 according to an embodiment of the present invention. The wireless communication device 10 can be any electronic product having wireless communication functionality, such as a mobile phone, a computer system, a wireless access point, etc., and is briefly composed of an RF signal processing device 100 and an RF device 102. The RF signal processing device 100 is utilized for generating an RF signal RF_sig, and adjusting the power of the RF signal RF_sig according to a sensing result CAP_rst of an environment capacitance sent back from the RF device 102. The RF device 102 includes a grounding unit 104, an antenna 106, a capacitive sensing unit 114, DC blocking elements 116, 118 and a high-frequency blocking element 120. The antenna 106 includes a radiating element 108, a signal feed-in unit 110, and a ground terminal 112. The antenna 106 may be a planer inverted F antenna (PIFA), a dipole antenna, a folded dipole antenna, a loop antenna, a microstrip antenna or a coupling antenna, but is not limited herein. The capacitive sensing unit 114 is utilized for sensing an environment capacitance within a specific range via the radiating element 108, and generating the sensing result CAP_rst accordingly. The DC blocking element 116 is coupled between the ground terminal 112 of the antenna 106 and the grounding unit 104, for cutting off a dc signal route from the ground terminal 112 to the grounding unit 104. The DC blocking element 118 is electrically connected between the radiating element 108 and the signal feed-in unit 110, for cutting off a dc signal route from the radiating element 108 to the signal feed-in unit 110. The high-frequency blocking element 120 is electrically connected between the radiating element 108 and the capacitive sensing unit 114, for cutting off a high-frequency signal route from the radiating element 108 to the capacitive sensing unit 114.

In brief, in the wireless communication device 10, the capacitive sensing unit 114 utilizes the radiating element 108 of the antenna 106 to sense the environment capacitance and transmit the sensing result CAP_rst to the RF signal processing device 100. Accordingly, the RF signal processing device 100 may adjust the power of the RF signal RF_sig. Besides, because there is a dc connecting path between the antenna 106 and the grounding unit 104, the RF device 102 utilizes the DC blocking element 116 to cut off the dc signal route from the ground terminal 112 to the grounding unit 104 so as to prevent the capacitive sensing unit 114 from sensing the environment capacitance via the grounding unit 104. Furthermore, the RF device 102 also utilizes the DC blocking element 118 to cut off the dc signal route from the radiating element 108 to the signal feed-in unit 110 in order to prevent the capacitive sensing unit 114 from charging the signal feed-in unit 110, avoid malfunction, and increase the sensing distance of the capacitive sensing unit 114. The high-frequency blocking element 120 is utilized for cutting off the high-frequency signal route from the radiating element 108 to the capacitive sensing unit 114, and adjusting high-frequency input impedance of the capacitive sensing unit 114, so as to reduce the impact of the capacitive sensing unit 114 on the antenna efficiency.

The DC blocking element 118 for cutting off the dc signal route from the radiating element 108 to the signal feed-in unit 110 may be one or more capacitors, a coupler, or any composite element having a dc blocking characteristic. The high-frequency blocking element 120 for cutting off the high-frequency signal route from the radiating element 108 to the capacitive sensing unit 114 may be one or more inductors, a connecting element, a matching network, or any composite element having a high-frequency blocking characteristic. In such a condition, when the RF device 102 needs to emit or receive RF signals via the radiating element 108, the high-frequency blocking element 120 is equivalent to an open circuit for RF signal, i.e., the input impedance seen from the radiating element 108 to the capacitive sensing unit 114 can be regarded as infinite. Therefore, the impedance matching of the radiating element 108 remains unaffected and the antenna efficiency is not affected by the capacitive sensing unit 114. Besides, the DC blocking element 118 is equivalent to a short circuit for RF signal so that the DC blocking element 118 does not affect the RF signals emitted and received by the radiating element 108. On the other hand, when the capacitive sensing unit 114 needs to sense the environment capacitance, the high-frequency blocking element 120 is equivalent to a short circuit for dc signals, i.e., both the metal on the high-frequency blocking element 120 and the radiating element 108 become part of the sensing metal. The DC blocking element 118 is equivalent to an open circuit for dc signals, i.e., the dc signals from the capacitive sensing unit 114 are blocked by the DC blocking element 118 to prevent charging the signal feed-in unit 110, so as to avoid malfunction of the signal feed-in unit 110 or the capacitive sensing unit 114. In addition, the metal connected to the radiating element 108 on the DC blocking element 118 also becomes part of the sensing metal for the capacitive sensing unit 114, thereby increasing the sensing distance. In short, the sensing distance of the sensing unit is increased without affecting antenna efficiency of the antenna 106 by using the DC blocking element 118 and the high-frequency blocking element 120.

The capacitive sensing unit 114 of the wireless communication device 10 utilizes the radiating element 108 of the antenna 106 to achieve a sensing function, so there is no need to add a receiver or sensor. Consequently, required space for disposing the capacitive sensing unit 114 is reduced. In addition, when the RF device 102 needs to emit or receive RF signals via the radiating element 108, the DC blocking element 118 of the wireless communication device 10 cuts off the RF signals from the radiating element 108 to the capacitive sensing unit 114 so that the antenna 106 is not affected by the capacitive sensing unit 114. When the capacitive sensing unit 114 performs the sensing function, the DC blocking element 118 cuts off the dc signal route from the capacitive sensing unit 114 to the signal feed-in unit 110 so that the capacitive sensing unit 114 is not affected by the signal feed-in unit 110. Therefore, the DC blocking element 118 and the high-frequency blocking element 120 help the wireless communication device 10 to increase the sensing distance of the capacitive sensing unit 114 and avoid affecting the antenna efficiency of the antenna 106.

The wireless communication device 10 shown in FIG. 1 is used to illustrate how to effectively sense the approach of a human body for an antenna having a dc connecting path between its radiating element and ground terminal, without adding a receiver or a sensor that may affect antenna efficiency. Those skilled in the art can make modifications or alterations accordingly. For example, the antenna 106 represents an antenna having a dc connecting path between the radiating element and the ground terminal, but is not limited to a specific form. Likewise, the capacitive sensing unit 114 is used for sensing environment capacitance via the radiating element 108 of the antenna 106, but the way it operates, the connecting position thereof in relation to the radiating element 108, and the generating method, form or content of the sensing result CAP_rst are not restricted to any specific rules. Moreover, the DC blocking element 116 for cutting off the dc signal route from the ground terminal 112 to the grounding unit 104 may be one or more capacitors, a coupler, or any composite element having a dc blocking characteristic. Special specifications (e.g. high capacitance) may be required to achieve the same objective (i.e., cutting off the dc signal route) in certain applications.

Figure 2A:
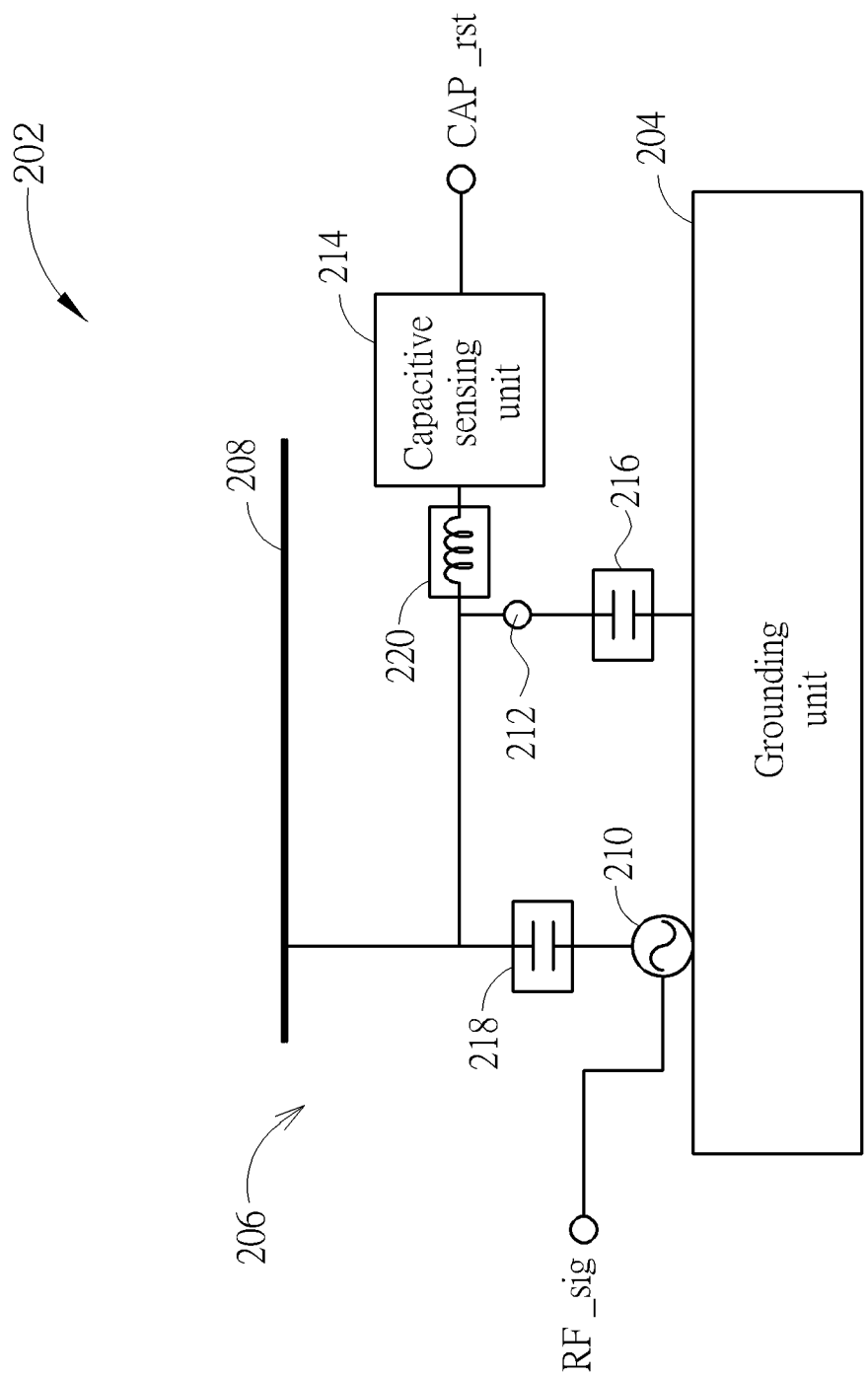
FIG. 2A is a schematic diagram of an RF device according to an embodiment of the present invention.

For example, please refer to FIG. 2A, which is a schematic diagram of an RF device 202 according to an embodiment of the present invention. The RF device 202 is an embodiment of the RF device 102 in FIG. 1; therefore, elements with the same function are denominated with the same manner. That is, the RF device 202 includes a grounding unit 204, an antenna 206, a capacitive sensing unit 214, DC blocking elements 216, 218, and a high-frequency blocking element 220. The antenna 206 includes a radiating element 208, a signal feed-in unit 210 and a ground terminal 212. As shown in FIG. 2A, the antenna 206 is a dual-band antenna. The high-frequency blocking element 220 is connected between the capacitive sensing unit 214 and the radiating element 208; however, the electrically connecting behavior between the capacitive sensing unit 214 and the radiating element 208 is unaffected such that the metal on the radiating element 208 and the DC blocking element 218 becomes part of the sensing metal of the capacitive sensing unit 214. An effective capacitance of the DC blocking element 218 can be between 3.3 pF and 56 pF, and an effective capacitance of the DC blocking element 216 can be between 3.3 pF and 33 pF, in order to ensure that the high-frequency signals are well conducted and achieve a preferred sensing distance. Besides, the connecting position of the capacitive sensing unit 214 and the radiating element 208 via the radiating element 208 is not limited to the same position shown in FIG. 2A. For example, FIGS. 2B and 2C show another two dispositions that may be employed by the capacitive sensing unit 214, which are also within the scope of the present invention.

Figure 2B:
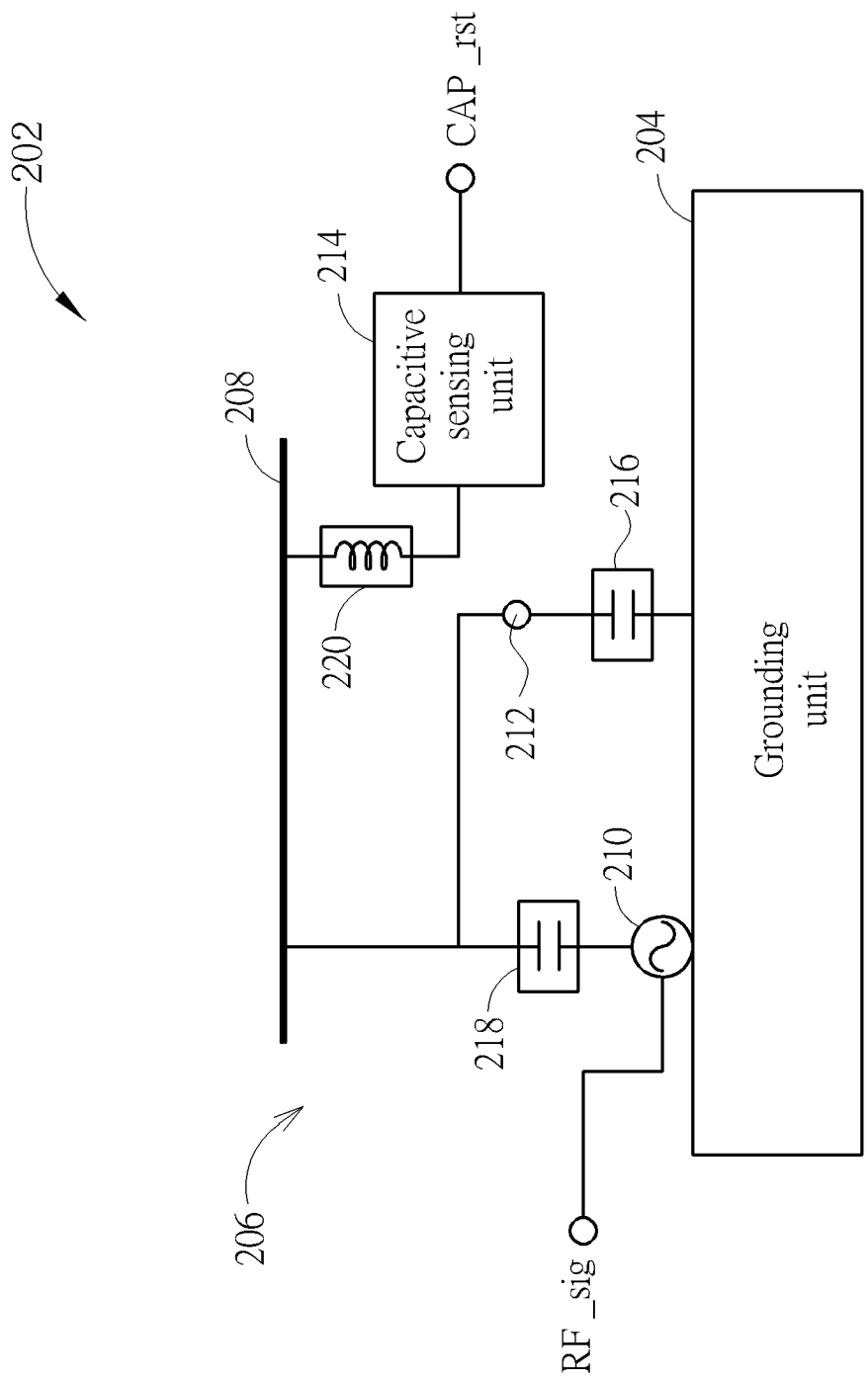
FIGS. 2B to 2D are schematic diagrams of different variations of the RF device shown in FIG. 2A.
Figure 2C:
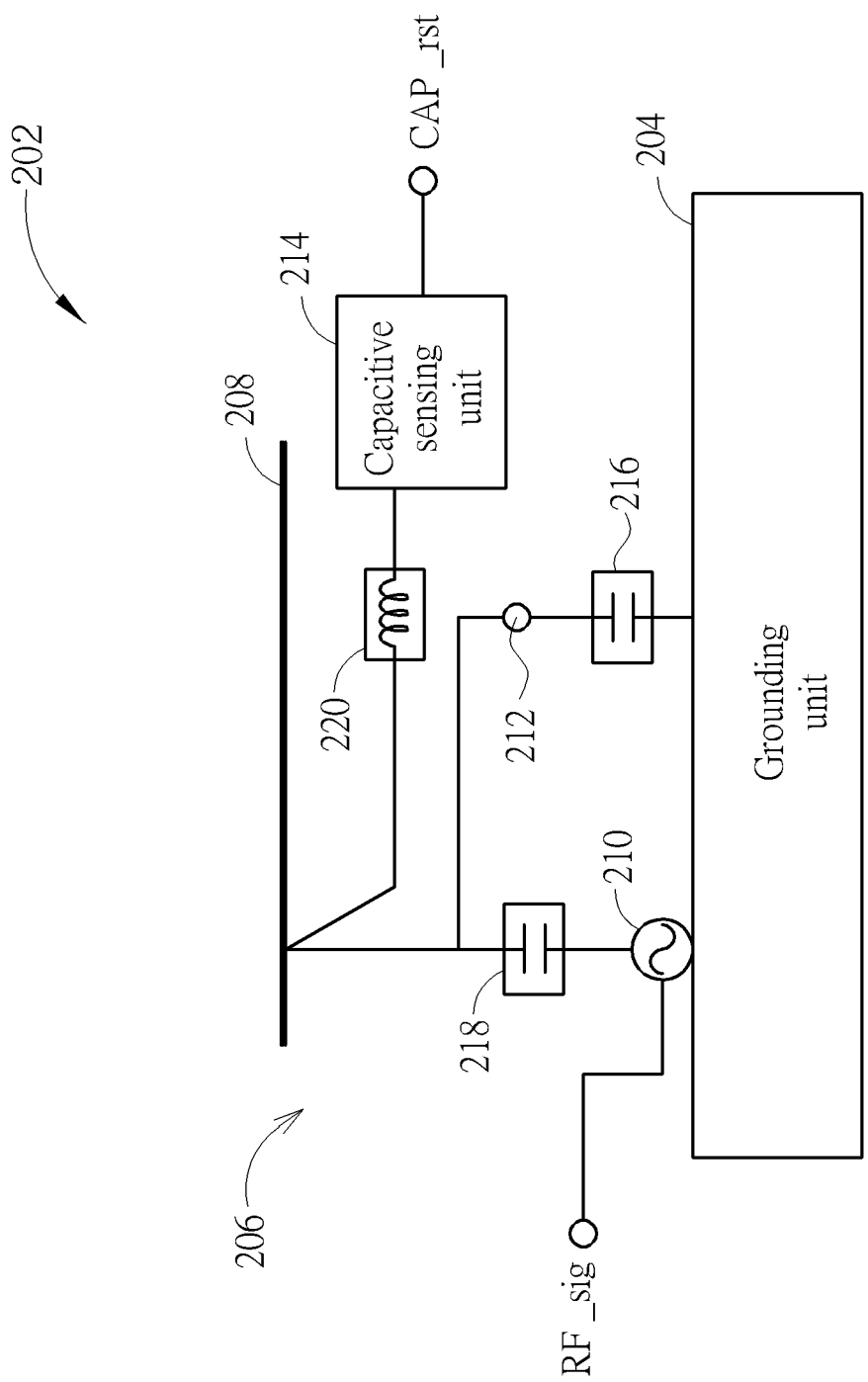
Figure 2D:
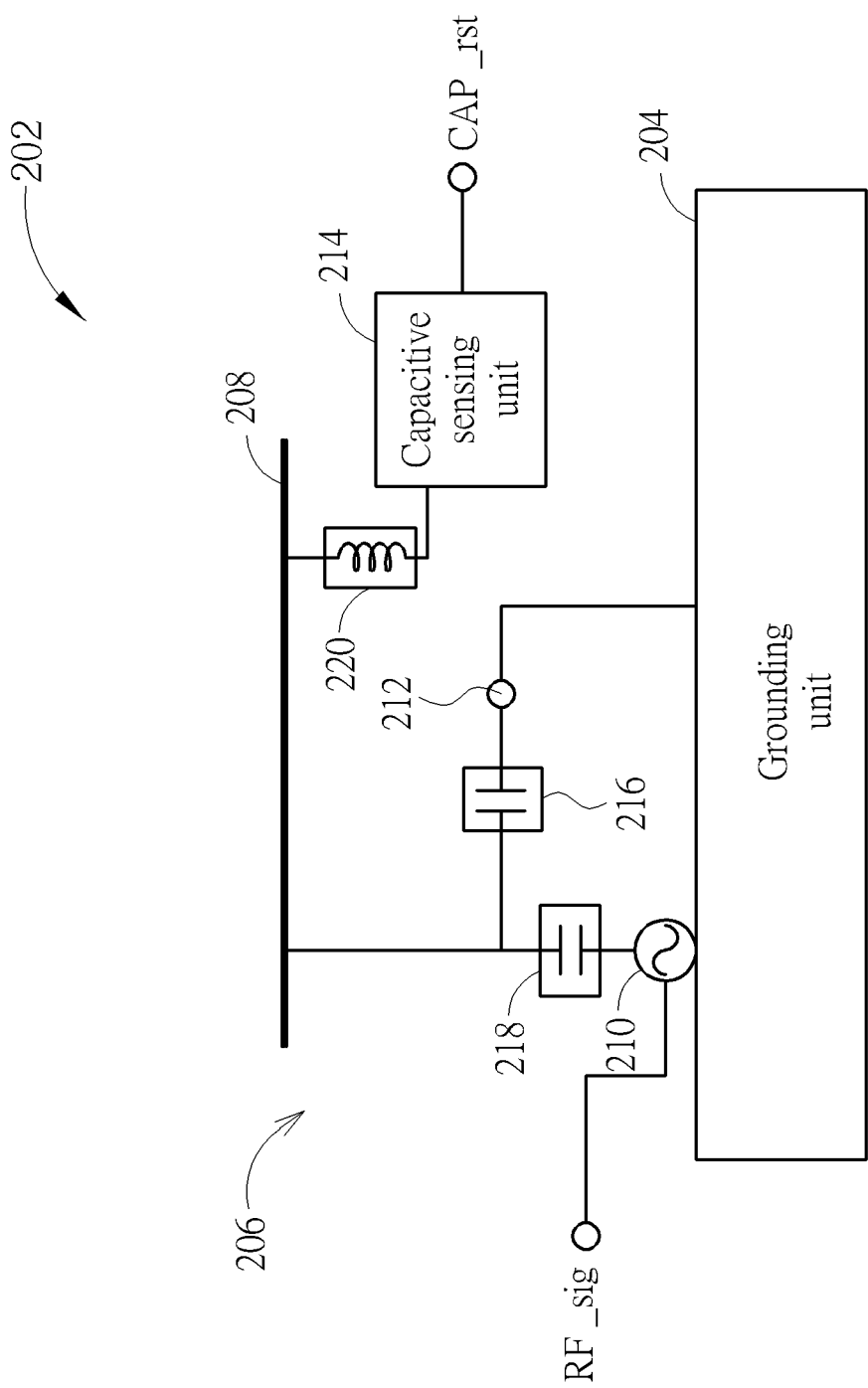

FIGS. 2B and 2C show that the disposition of the capacitive sensing unit 214 is not limited as long as the capacitive sensing unit 214 is electrically connected to the radiating element 208 via the high-frequency blocking element 220. In addition, the disposition of the DC blocking element 216 can be appropriately adjusted, as long as the dc connecting path between the capacitive sensing unit 214 and the grounding unit 204 can be cut off. In other words, when the capacitor sensing unit 214 is disposed on a tail of the radiating element 208 (as the example shown in FIG. 2B), the disposition of the DC blocking element 216 can be changed as the disposition that shown in FIG. 2D. In such a condition, the position of the ground terminal 212 is redefined. Briefly, in the present embodiment, the ground terminal 212 (or the ground terminal 112) is defined as a point between the radiating element 208 and the grounding unit 204. More precisely, the ground terminal 212 (or the ground terminal 112) is used to define the position of the DC blocking element 216 in relation to the capacitive sensing unit 214, and therefore the ground terminal 212 can be adjusted adaptively.

Likewise, various types of antennas including the same characteristic (i.e. a dc connecting path between the radiating element and the ground terminal) can be derived and varied appropriately according to embodiments shown in FIGS. 2A to 2D.

Figure 3:
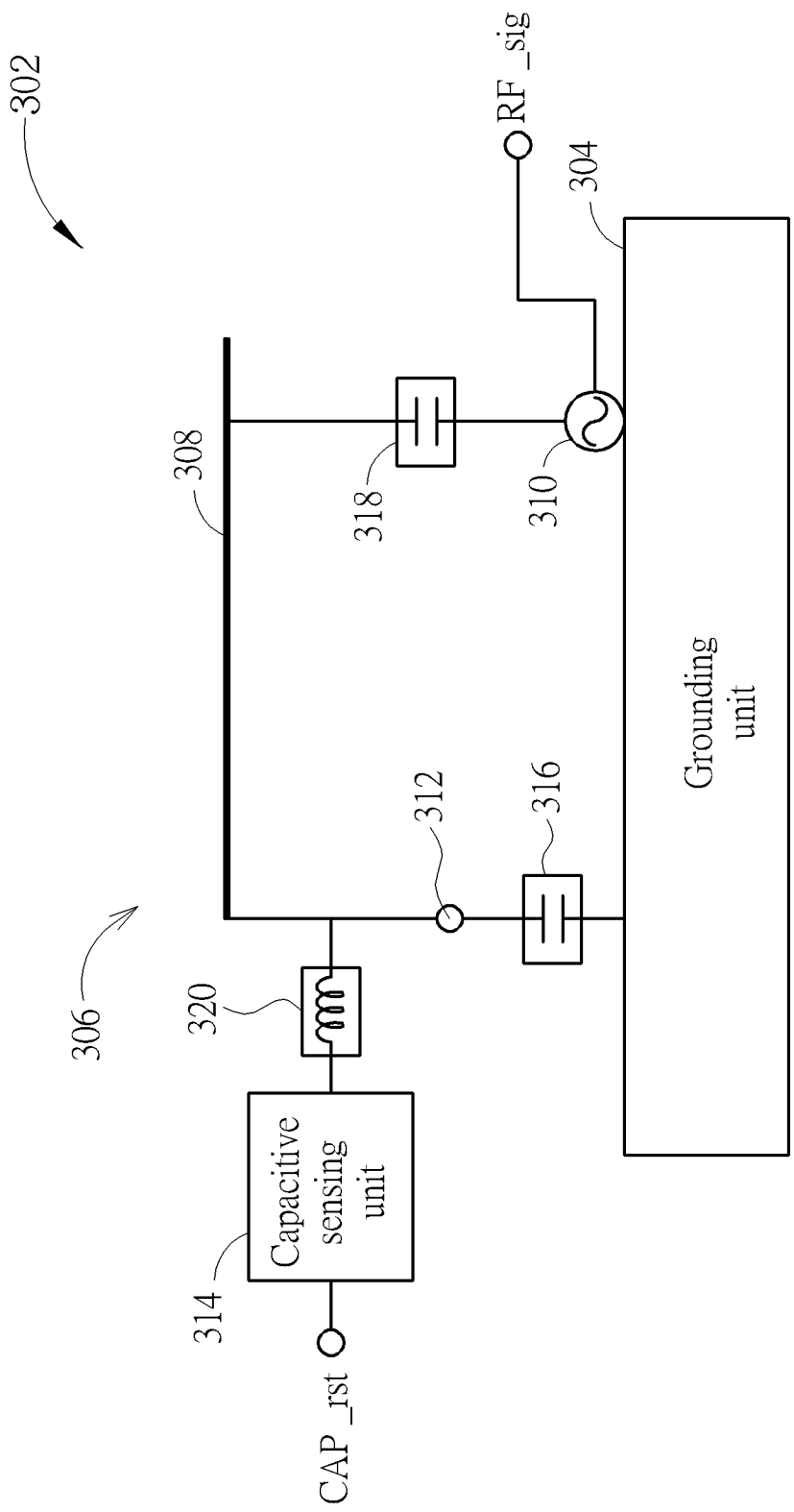
FIG. 3 is a schematic diagram of an RF device according to an embodiment of the present invention.

Please refer to FIG. 3, which is a schematic diagram of an RF device 302 according to an embodiment of the present invention. The RF device 302 is an embodiment of the RF device 102 shown in FIG. 1; therefore, elements with the same function are denominated with the same manner. That is, the RF device 302 includes a grounding unit 304, an antenna 306, a capacitive sensing unit 314, DC blocking elements 316, 318, and a high-frequency blocking element 320. The antenna 306 includes a radiating element 308, a signal feed-in unit 310, and a ground terminal 312. As shown in FIG. 3, the antenna 306 is a planer inverted F antenna. The capacitive sensing unit 314 is required to be electrically connected to the radiating element 308 via the high-frequency blocking element 320, and the dc signal route from the radiating element 308 to the signal feed-in unit 310 is cut off by the DC blocking element 318. Other modifications such as varying the disposition of the capacitive sensing unit 314 and the position of the DC blocking element 316 should be readily made by those skilled in the art according to examples shown in FIGS. 2B to 2D, and are not narrated for simplicity.

Figure 4:
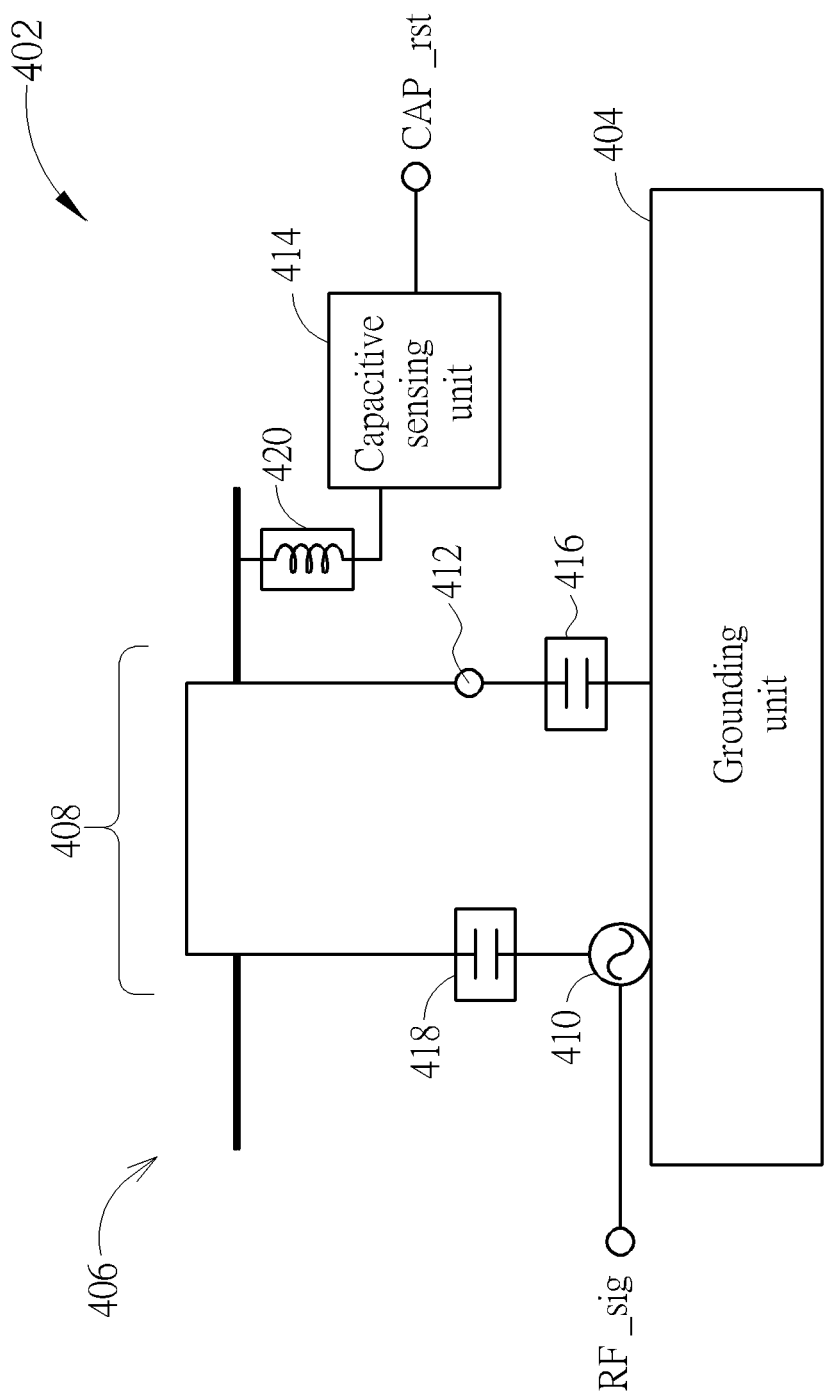
FIG. 4 is a schematic diagram of an RF device according to an embodiment of the present invention.

Please refer to FIG. 4, which is a schematic diagram of an RF device 402 according to an embodiment of the present invention. The RF device 402 is an embodiment of the RF device 102 in FIG. 1; therefore, elements with the same function are denominated with the same manner. That is, the RF device 402 includes a grounding unit 404, an antenna 406, a capacitive sensing unit 414, DC blocking elements 416, 418 and a high-frequency blocking element 420. The antenna 406 includes a radiating element 408, a signal feed-in unit 410, and a ground terminal 412. As shown in FIG. 4, the antenna 406 is a dipole antenna. The capacitive sensing unit 414 is required to be electrically connected to the radiating element 408 via the high-frequency blocking element 420, and the dc signal route from the radiating element 408 to the signal feed-in unit 410 is cut off by the DC blocking element 418. Other modifications, such as varying the disposition of the capacitive sensing unit 414 and the position of the DC blocking element 416 should be readily made by those skilled in the art according to examples shown in FIGS. 2B to 2D, and are not narrated for simplicity.

Figure 5:
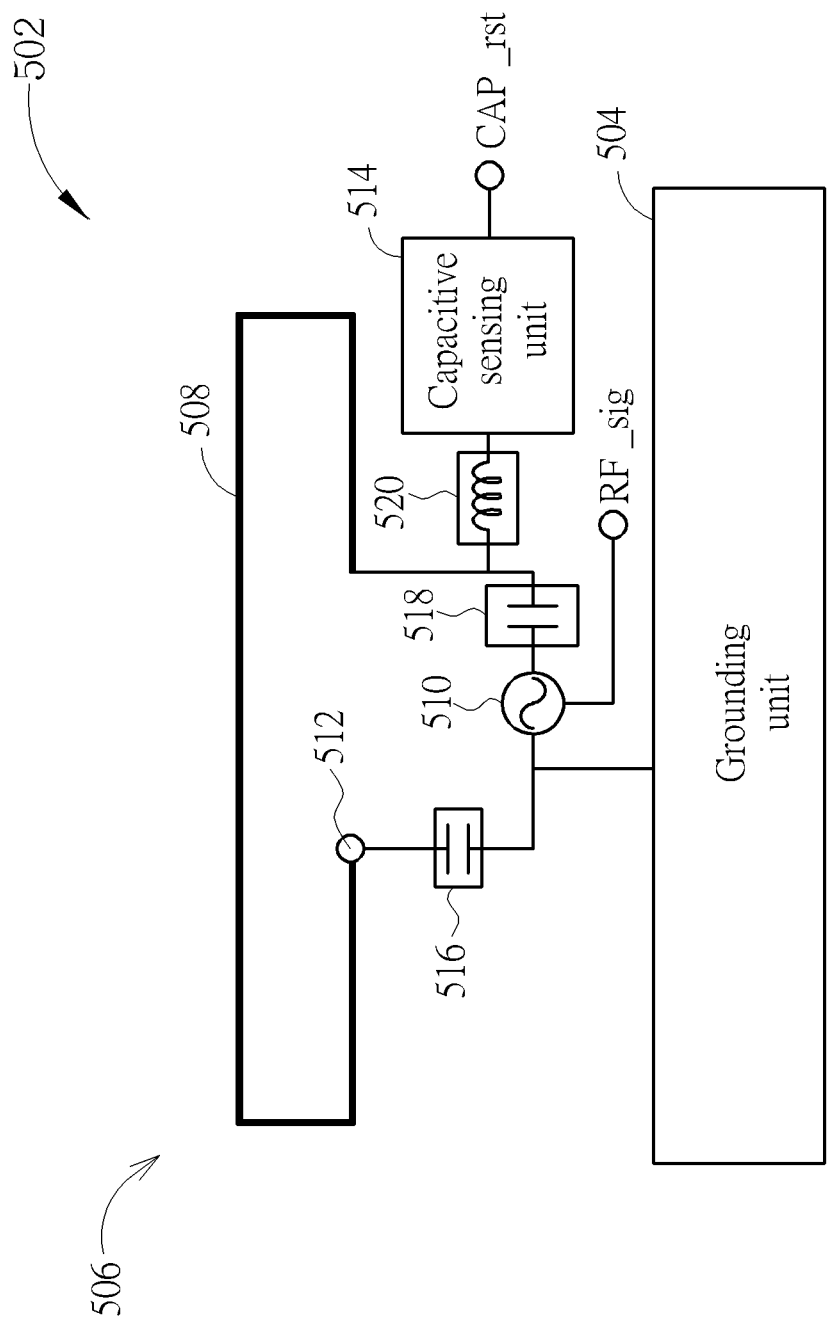
FIG. 5 is a schematic diagram of an RF device according to an embodiment of the present invention.

Please refer to FIG. 5, which is a schematic diagram of an RF device 502 according to an embodiment of the present invention. The RF device 502 is an embodiment of the RF device 102 in FIG. 1; therefore, elements with the same function are denominated with the same manner. That is, the RF device 502 includes a grounding unit 504, an antenna 506, a capacitive sensing unit 514, DC blocking elements 516, 518 and a high-frequency blocking element 520. The antenna 506 includes a radiating element 508, a signal feed-in unit 510, and a ground terminal 512. As shown in FIG. 5, the antenna 506 is a dipole antenna. The capacitive sensing unit 514 is required to be electrically connected to the radiating element 508 via the high-frequency blocking element 520, and the dc signal route from the radiating element 508 to the signal feed-in unit 510 is cut off by the DC blocking element 518. Other modifications, such as varying the disposition of the capacitive sensing unit 514 and the position of the DC blocking element 516, etc. should be readily made by those skilled in the art according to examples shown in FIGS. 2B to 2D, and are not narrated for simplicity.

Figure 6:
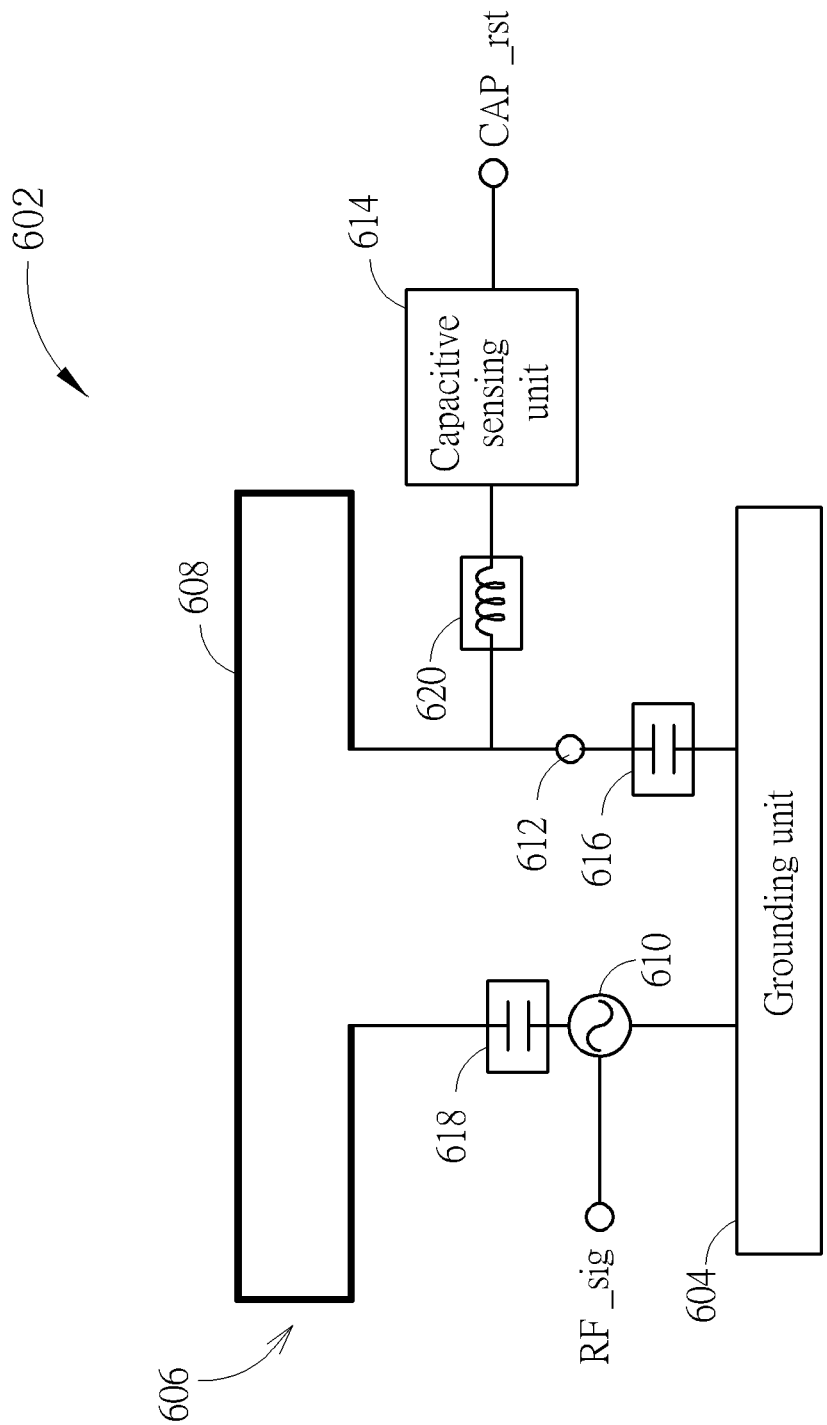
FIG. 6 is a schematic diagram of an RF device according to an embodiment of the present invention.

Please refer to FIG. 6, which is a schematic diagram of an RF device 602 according to an embodiment of the present invention. The RF device 602 is an embodiment of the RF device 102 in FIG. 1; therefore, elements with the same function are denominated with the same manner. That is, the RF device 602 includes a grounding unit 604, an antenna 606, a capacitive sensing unit 614, DC blocking elements 616, 618 and a high-frequency blocking element 620. The antenna 606 includes a radiating element 608, a signal feed-in unit 610, and a ground terminal 612. As shown in FIG. 6, the antenna 606 is a loop antenna. The capacitive sensing unit 614 is required to be electrically connected to the radiating element 608 via the high-frequency blocking element 620, and the dc signal route from the radiating element 608 to the signal feed-in unit 610 is cut off by the DC blocking element 618. Other modifications, such as varying the disposition of the capacitive sensing unit 614 and the position of the DC blocking element 616, etc. should be readily made by those skilled in the art according to examples shown in FIGS. 2B to 2D, and are not narrated for simplicity.

Figure 7:
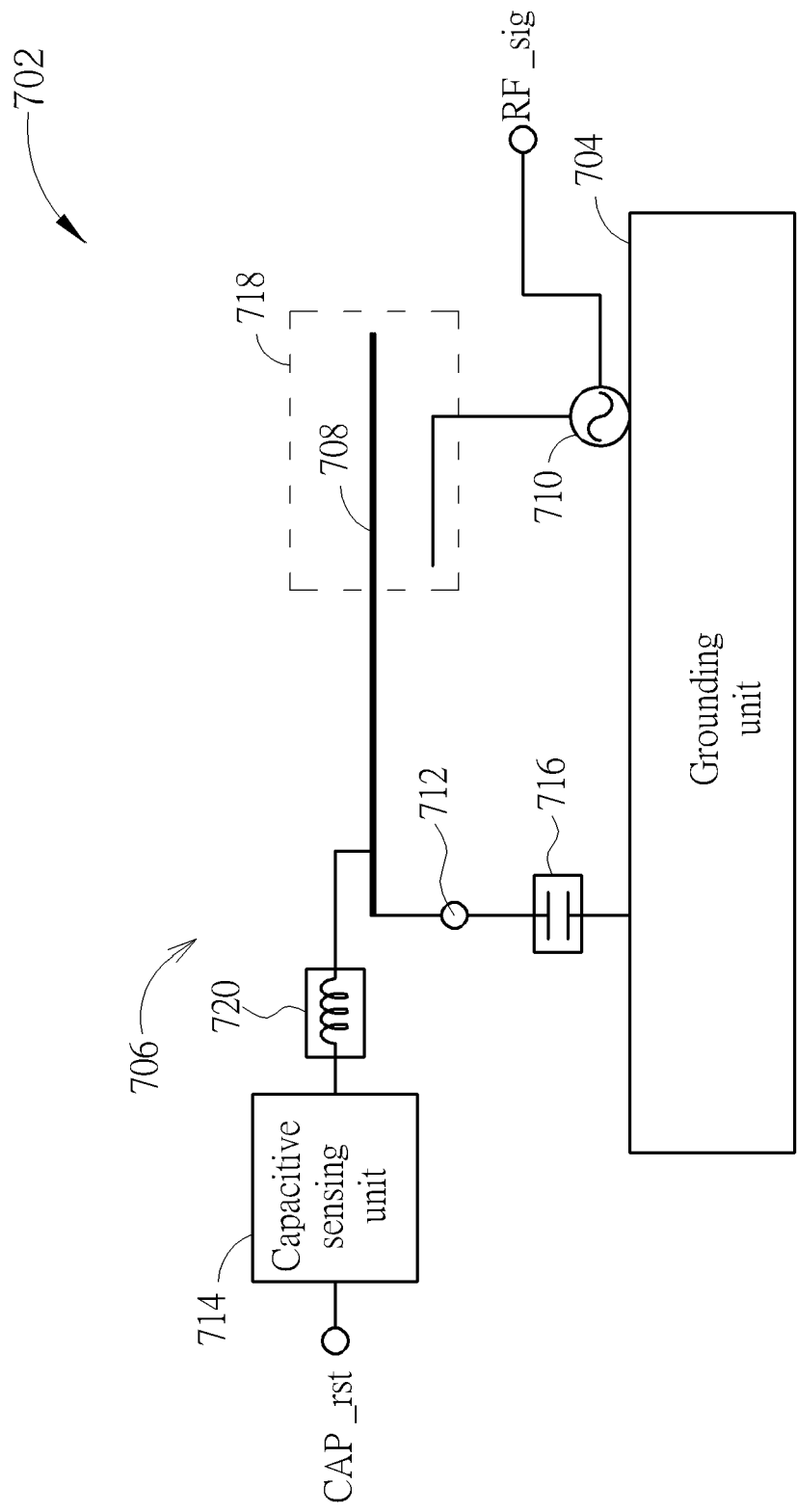
FIG. 7 is a schematic diagram of an RF device according to an embodiment of the present invention.

In addition, as to the wireless communication device 10 shown in FIG. 1, the feed-in method of the signal feed-in unit 110 is not restricted in the present invention. That is, the signal feed-in unit 110 can be coupled to the radiating element 108 via coupling connection or electrical connection. For example, please refer to FIG. 7, which is a schematic diagram of an RF device 702 according to an embodiment of the present invention. The RF device 702 is an embodiment of the RF device 102 in FIG. 1; therefore, elements with the same function are denominated with the same manner. That is, the RF device 702 includes a grounding unit 704, an antenna 706, a capacitive sensing unit 714, DC blocking elements 716, 718 and a high-frequency blocking element 720. The antenna 706 includes a radiating element 708, a signal feed-in unit 710, and a ground terminal 712. Since the signal feed-in unit 710 feeds-in the RF signal RF_sig to the radiating element 708 by coupling, there is no dc signal route between the radiating element 708 and the signal feed-in unit 710, which is equivalent to having the DC blocking element 718 between the radiating element 708 and the signal feed-in unit 710. In addition, the capacitive sensing unit 714 is required to be electrically connected to the radiating element 708 via the high-frequency blocking element 720. Other modifications, such as varying the disposition of the capacitive sensing unit 714, the position of the DC blocking element 716, etc. should be readily made by those skilled in the art according to examples shown in FIGS. 2B to 2D, and are not narrated for simplicity.

For the wireless communication device 10 shown in FIG. 1, the number of the radiating element 108 is not restricted to a specific number. That is, the radiating element 108 may be composed of two or more sub-radiating elements, and the sub-radiating elements may have coupling effect between each other. For example, please refer to FIG. 8A, which is a schematic diagram of an RF device 802 according to an embodiment of the present invention. The RF device 802 is an embodiment of the RF device 102 in FIG. 1; therefore, elements with the same function are denominated with the same manner. That is, the RF device 802 includes a grounding unit 804, an antenna 806, a capacitive sensing unit 814, DC blocking elements 816, 818 and a high-frequency blocking element 820. The antenna 806 includes a radiating element 808, a signal feed-in unit 810, and a ground terminal 812. The radiating element 808 consists of sub-radiating elements 808_r1, 808_r2 and 808_r3. An inductor IND is further included between the sub-radiating elements 808_r2, 808_r3 and the sub-radiating element 808_r1, so as to increase the sensing area of the capacitive sensing unit 814, thereby increasing the sensing distance. Since the inductor IND is high impedance under the operation frequency of the antenna 806, high-frequency signals do not flow between the sub-radiating elements 808_r2, 808_r3 and the sub-radiating element 808_r1 so that the inductor IND does not impact on the antenna efficiency. An effective capacitance of the DC blocking element 816 can be between 3.3 pF and 56 pF, and an effective capacitance of the DC blocking element 816 can be between 3.3 pF and 33 pF, in order to ensure the high-frequency signals are well conducted and achieve a preferred sensing distance. An effective inductance of the inductor IND can be larger than 33 nH so as to avoid the impact on the antenna efficiency.

Figure 8A:
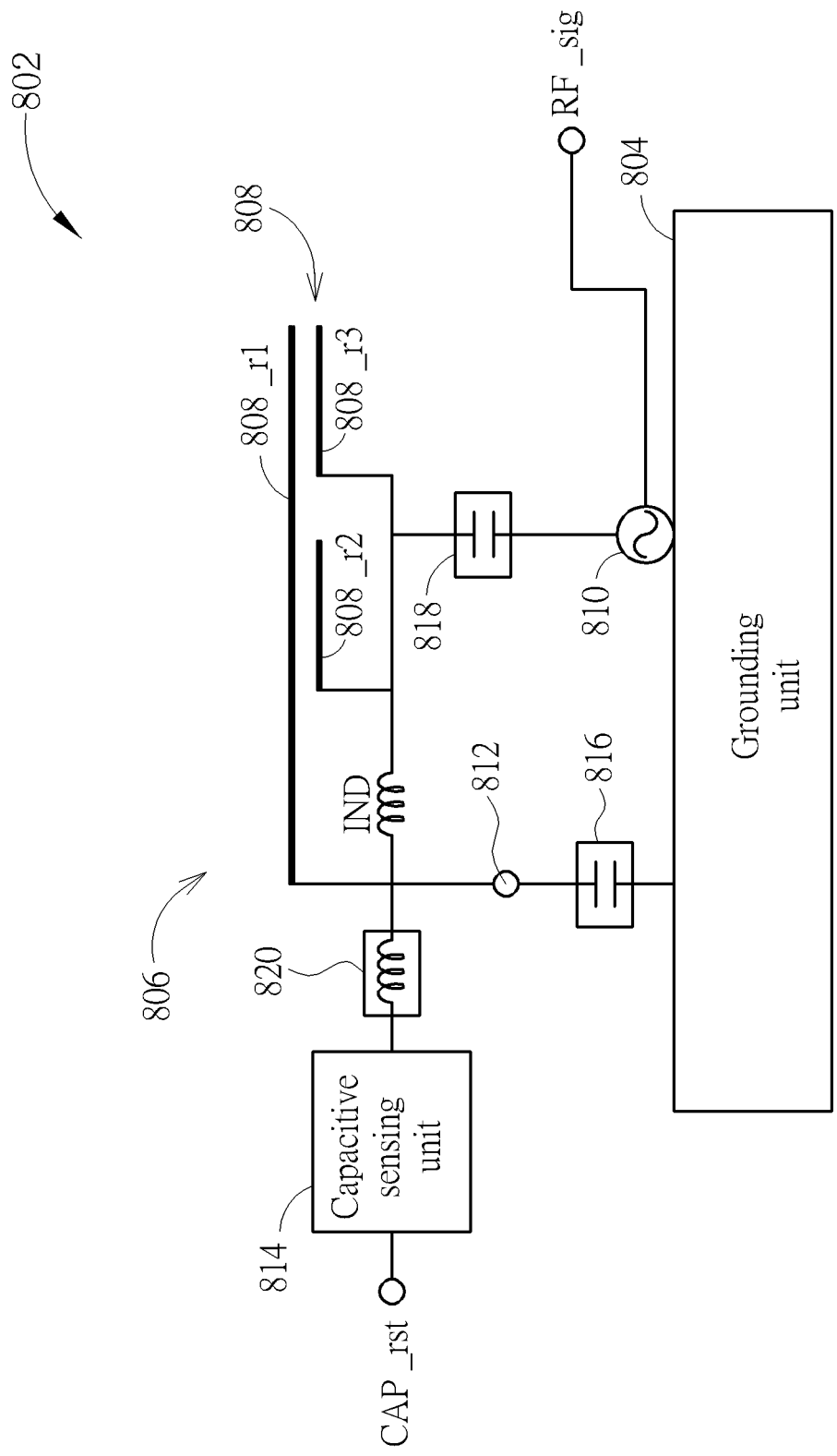
FIG. 8A is a schematic diagram of an RF device according to an embodiment of the present invention.
Figure 8B:
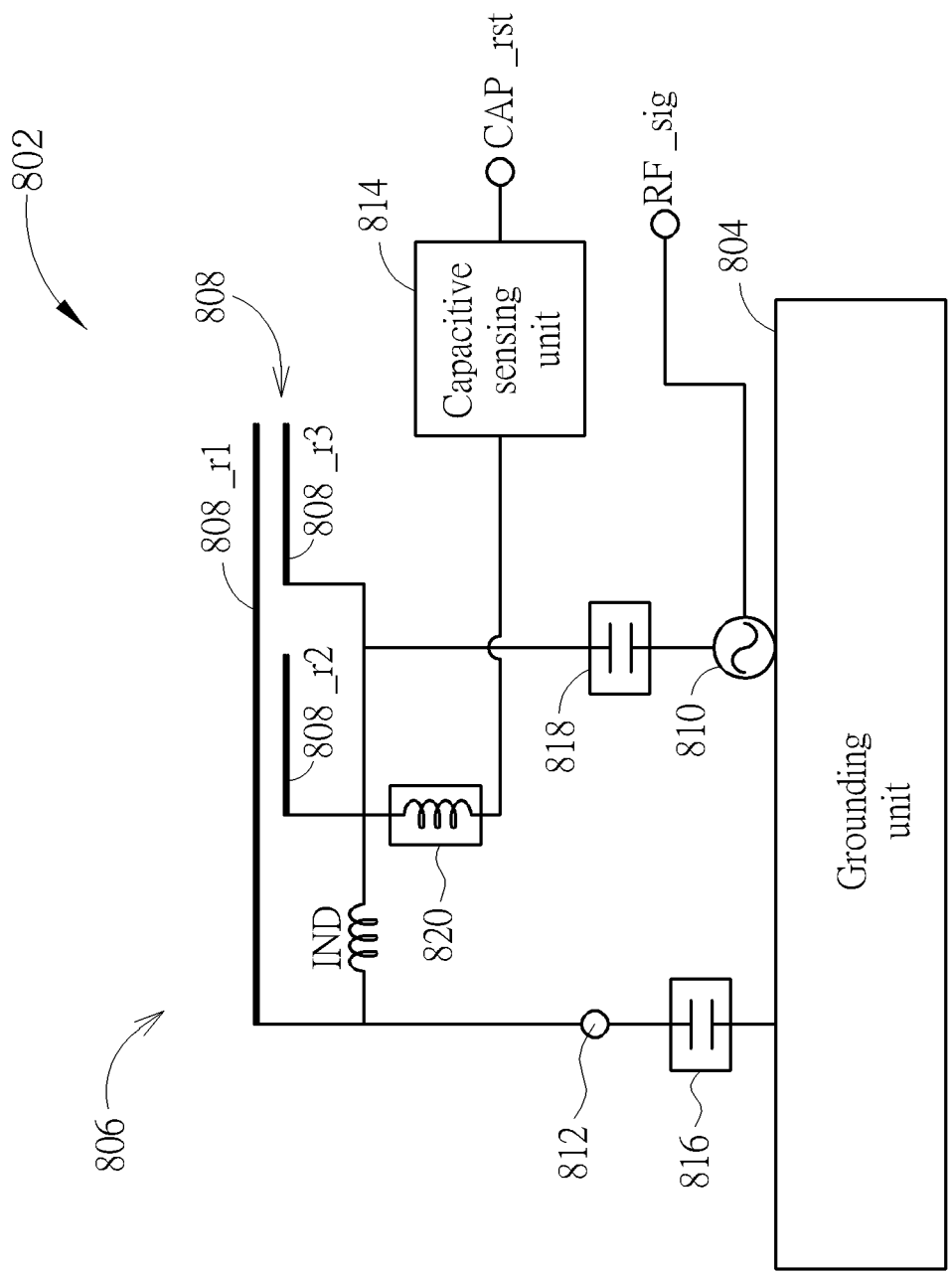
FIGS. 8B to 8C are schematic diagrams of different variations of the RF device shown in FIG. 8A.
Figure 8C:
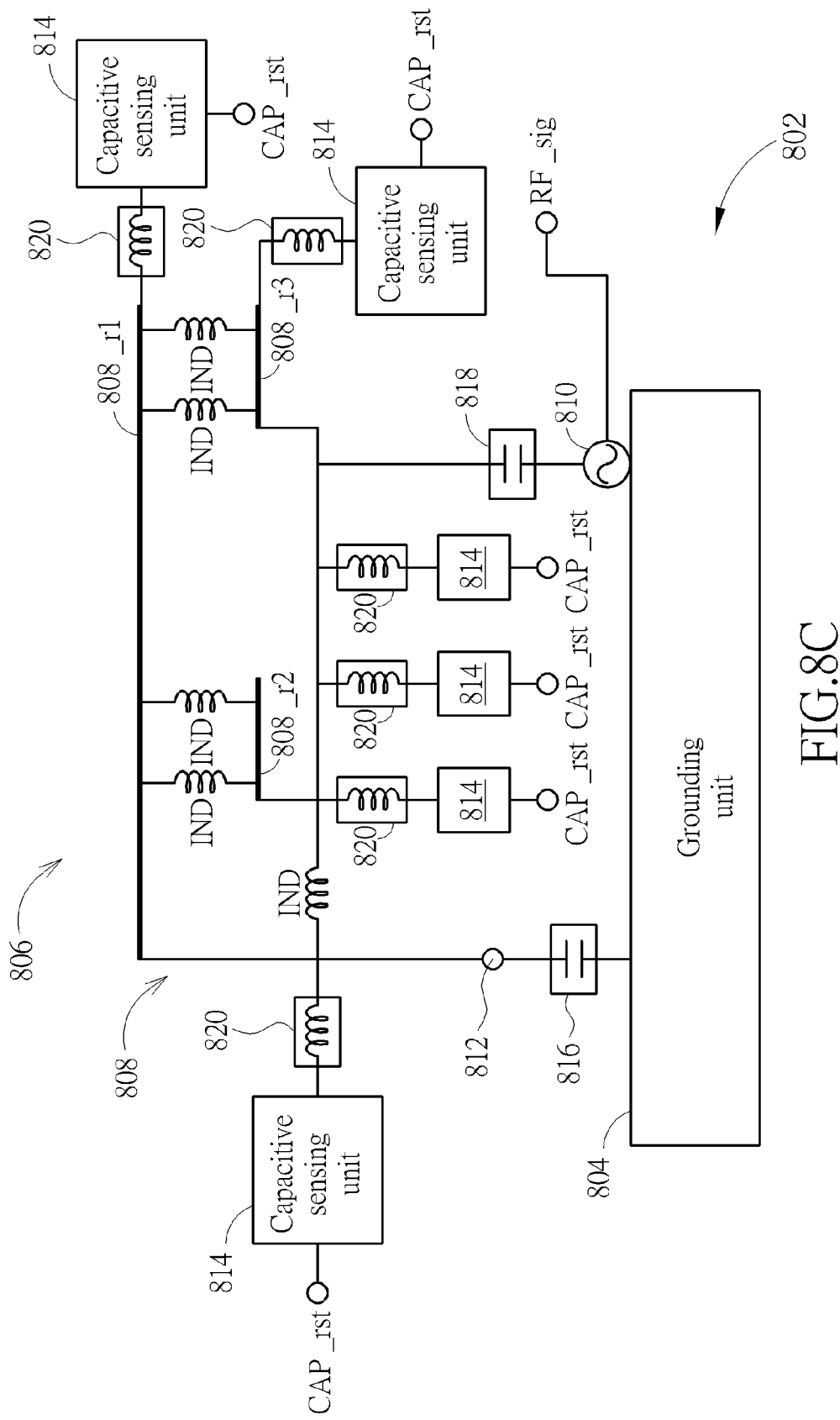

Noticeably, the capacitive sensing unit 814 is electrically connected to the radiating element 808 via the high-frequency blocking element 820, but the connection point thereof is not limited to the connection point that shown in FIG. 8A. For example, the capacitive sensing unit 814 may be connected to any point on the sub-radiating elements 808_r1, 808_r2, 808_r3 or the main body of the antenna 806 via the high-frequency blocking element 820, and the impact of the capacitive sensing unit 814 on the antenna efficiency may be reduced by adjusting the inductance of the inductor IND. The sub-radiating elements 808_r1, 808_r2, 808_r3 may be a high-frequency radiating element, a low-frequency radiating element, and another low-frequency radiating element. By connecting the inductor IND between the sub-radiating element 808_r1 and the sub-radiating elements 808_r2, 808_r3, the dc signal is conducted between the high-frequency and low-frequency radiating elements, such that the sensing area and the sensing distance of the capacitive sensing unit 814 are increased whereas the impact on the antenna efficiency is decreased by preventing an influence between high-frequency and low-frequency signals. The connection point of the inductor IND is not restricted to the connection point that shown in FIG. 8A. The inductor IND may be connected between the sub-radiating elements 808_r1 and 808_r2, the sub-radiating elements 808_r1 and 808_r3, or any points near the high-frequency and low-frequency radiating elements, and the inductance thereof is adjusted in order to achieve the above objectives. The abovementioned method (i.e., using the inductor IND) may be applied to any antenna structure having two or more high-frequency and low-frequency radiating elements in order to provide more dc signal routes between the high-frequency and low-frequency radiating elements, increase the sensing area and the sensing distance, prevent high-frequency signal flows between different radiating elements, and decrease the impact on the antenna efficiency. For example, FIGS. 8B and 8C show another two embodiments with different dispositions of the capacitive sensing unit 814 and the inductors IND. Such modifications should be readily made for those skilled in the art, and should be in the scope of the present invention.

FIGS. 8B and 8C show that the disposition of the capacitive sensing unit 814 is not limited as long as the capacitive sensing unit 814 is electrically connected to the radiating element 808 via the high-frequency blocking element 820. In addition, the connection points of the inductors IND can be adjusted adaptively as long as the inductors are connected between the sub-radiating elements 808_r1 and 808_r2 or the sub-radiating elements 808_r1 and 808_r3.

As described previously, multiple capacitors may be required to cut off the dc connecting path between the radiating element 108 and the grounding unit 104 in various applications such as a slot antenna and a slot coupling antenna. Modifications such as using multiple capacitors to cut off multiple dc connecting paths should be well known by those skilled in the art, so detailed descriptions are omitted herein.

Figure 9:
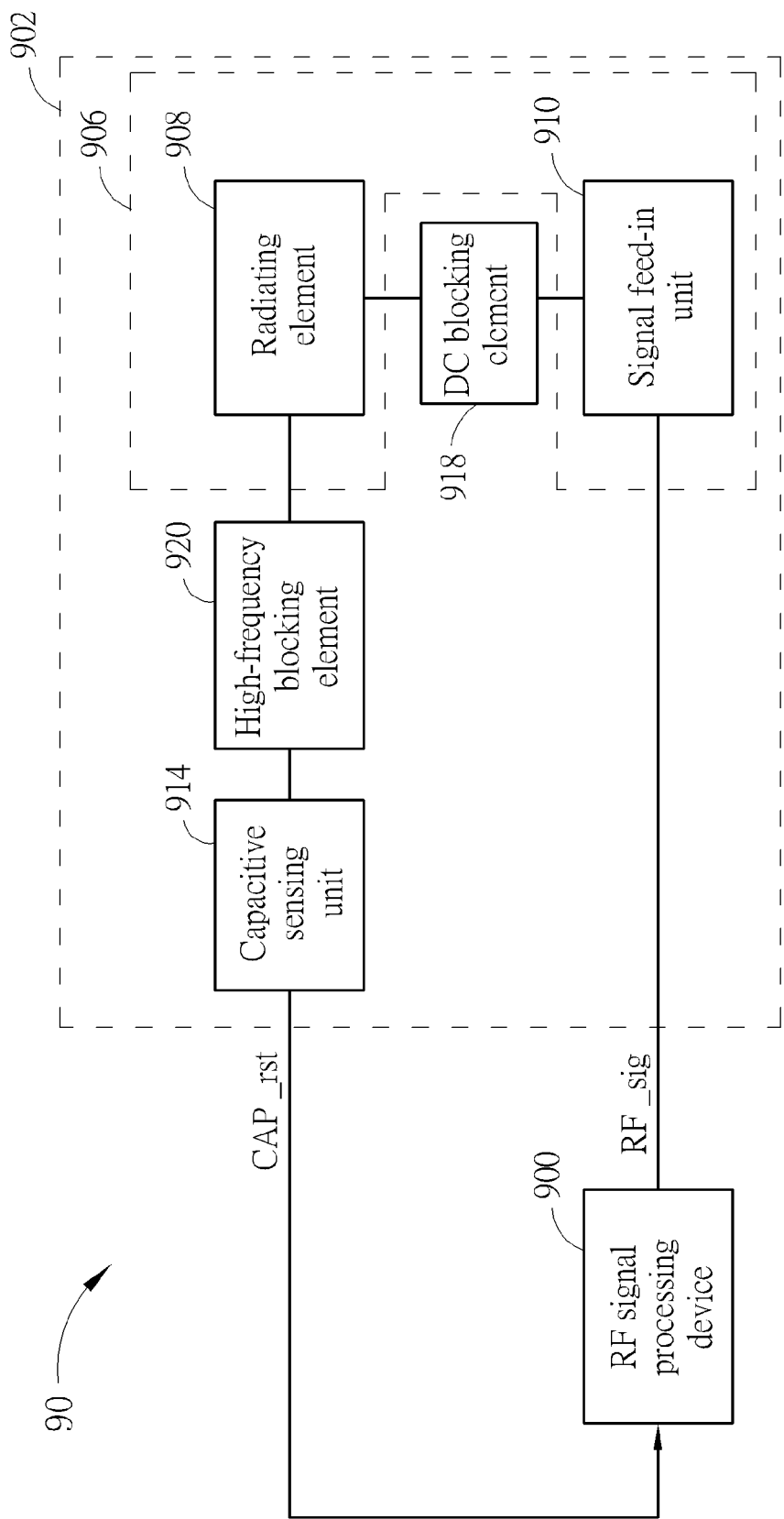
FIG. 9 is a schematic diagram of a wireless communication device according to an embodiment of the present invention.

On the other hand, as to antennas without direct-current (dc) connecting path between the radiating element and the ground terminal, please refer to FIG. 9, which is a schematic diagram of a wireless communication device 90 according to an embodiment of the present invention. The wireless communication device 90 may be any electronic product having wireless communication functionality, such as a mobile phone, a computer system, a wireless access point, etc., and is briefly composed of an RF signal processing device 900 and an RF device 902. The RF signal processing device 900 is utilized for generating an RF signal RF_sig, and may adjust the power of the RF signal RF_sig according to a sensing result CAP_rst of the environment capacitance sent back from the RF device 902. The RF device 902 includes an antenna 906, a capacitive sensing unit 914, a DC blocking element 918 and a high-frequency blocking element 920. The antenna 906 includes a radiating element 908 and a signal feed-in unit 910. The DC blocking element 918 is electrically connected between the radiating element 908 and the signal feed-in unit 910 for cutting of a dc signal route from the radiating element 908 to the signal feed-in unit 910. The high-frequency blocking element 920 is electrically connected between the radiating element 908 and the capacitive sensing unit 914 for cutting off a high-frequency signal route from the radiating element 908 to the capacitive sensing unit 914. The capacitive sensing unit 914 is electrically connected to the radiating element 908, for sensing an environment capacitance within a specific range via the radiating element 908, and generating a sensing result CAP_rst accordingly.

In brief, the operation of the wireless communication device 90 is similar to that of the wireless communication device 10; that is, the capacitive sensing unit 914 uses the radiating element 908 to sense the environment capacitance via the high-frequency blocking element 920 and transmits the sensing result CAP_rst to the RF signal processing device 900 for the RF signal processing device 900 to adjust the power of the RF signal RF_sig accordingly. In addition, the DC blocking element 918 is used for cutting off the dc signal route from the radiating element 908 to the signal feed-in unit 910 in order to avoid malfunction and increase the sensing distance of the capacitive sensing unit 914. The difference between the wireless communication device 90 and the wireless communication device 10 is that there is no dc connecting path between the antenna 906 and the ground terminal. Therefore, unlike the RF device 102, the RF device 902 does not include a DC blocking element to cut off the dc connecting path between the antenna 906 and the ground terminal. The wireless communication device 90 does not require additional receiver or sensor, but utilizes the original radiating element 908 in the RF device 902 for sensing environment capacitance. In this way, the embodiment of the present invention can prevent from affecting radiation efficiency of the antenna 906 as well as reduce the size of the wireless communication device 90. More importantly, only one antenna needs to be design for different communication systems having similar frequency bands. Therefore, the design and manufacturing costs can be reduced, and device components can be easily managed.

Figure 10:
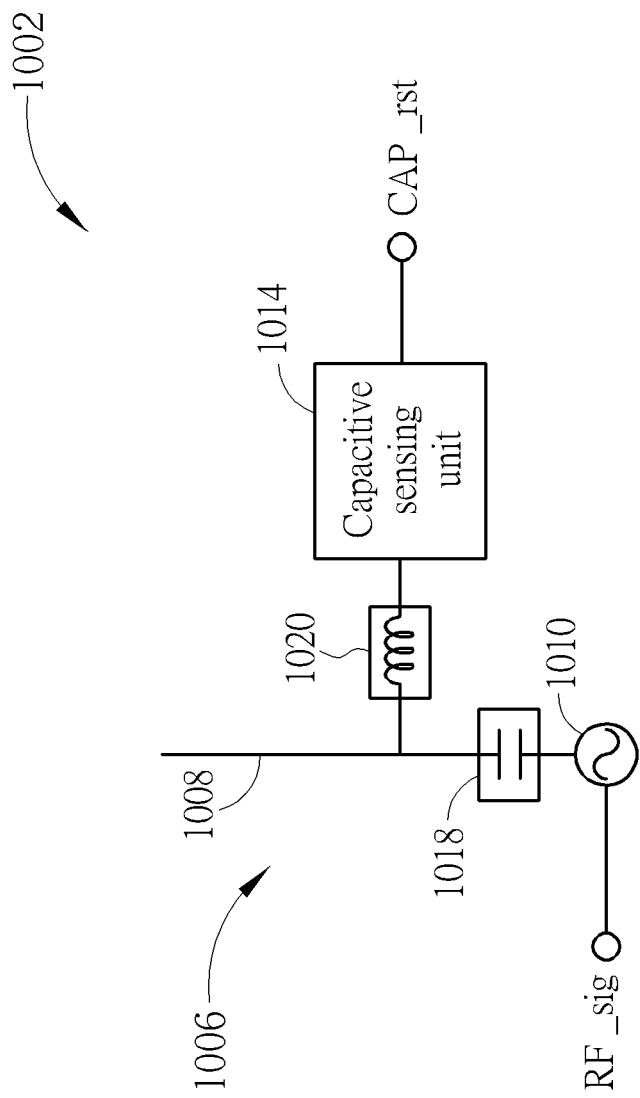
FIG. 10 is a schematic diagram of an RF device according to an embodiment of the present invention.

Noticeably, the wireless communication device 90 shown in FIG. 9 is used for illustrating how to effectively sense the approach of a human body for an antenna having no dc connecting path between a radiating element and a ground terminal thereof, without adding a receiver or sensor that may affect antenna efficiency. Other derivations and variations can be made by following the concept in abovementioned examples, and are not limited herein. For example, please refer to FIG. 10, which is a schematic diagram of an RF device 1002 according to an embodiment of the present invention. The RF device 1002 is an embodiment of the RF device 902 shown in FIG. 9; therefore, elements with the same function are denominated with the same manner. That is, the RF device 1002 includes an antenna 1006, a capacitive sensing unit 1014, a DC blocking element 1018 and a high-frequency blocking element 1020. The antenna 1006 includes a radiating element 1008 and a signal feed-in unit 1010. As shown in FIG. 10, the antenna 1006 is a monopole antenna. The capacitive sensing unit 1014 is required to be electrically connected to the radiating element 1008 via the high-frequency blocking element 1020. The dc signal route from the radiating element 1008 to the signal feed-in unit 1010 is cut off by the DC blocking element 1018. Modifications such as varying the disposition of the capacitive sensing unit 1014 should be readily made by those skilled in the art, and are not narrated herein.

Figure 11:
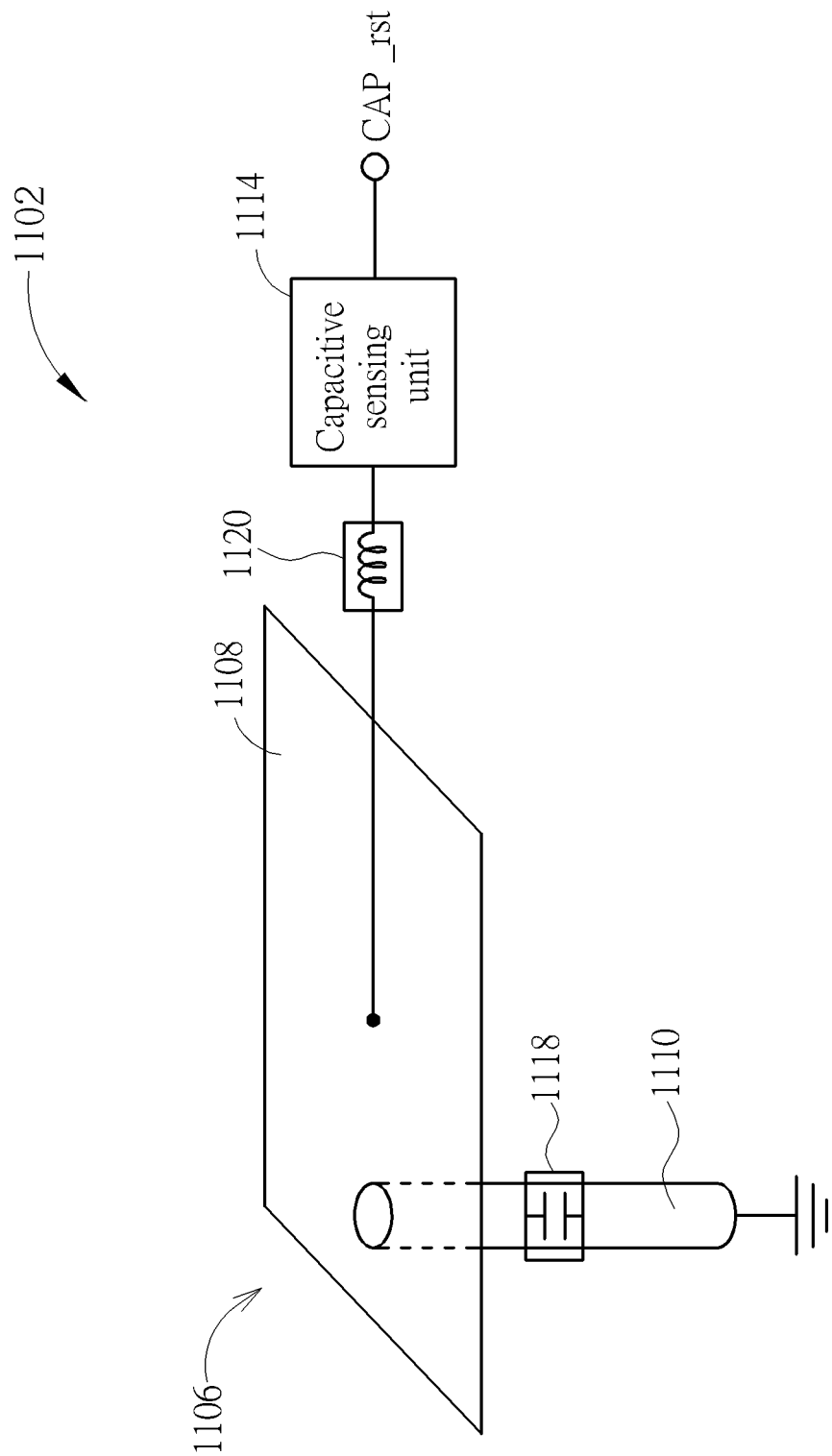
FIG. 11 is a schematic diagram of an RF device according to an embodiment of the present invention.

Please refer to FIG. 11, which is a schematic diagram of an RF device 1102 according to an embodiment of the present invention. The RF device is an embodiment of the RF device 902 shown in FIG. 9; therefore, elements with the same function are denominated with the same manner. That is, the RF device 1102 includes an antenna 1106, a capacitive sensing unit 1114, a DC blocking element 1118 and a high-frequency blocking element 1120. The antenna 1106 includes a radiating element 1108 and a signal feed-in unit 1110. As shown in FIG. 11, the antenna 1106 is a patch antenna. The capacitive sensing unit 1114 can be required to be electrically connected to the radiating element 1108 via the high-frequency blocking element 1120, but is not limited herein.

The above embodiments are classified into two categories according to whether an antenna includes a dc connecting path between the radiating element and the ground terminal, in order to illustrate the concept that the present invention utilizes the original radiating element in the RF device for sensing the environment capacitance instead of adding a receiver or sensor. Furthermore, the RF device utilizes a dc blocking element to cut off a dc signal route from the radiating element to the signal feed-in unit, and utilizes a high-frequency blocking element to cut off a high-frequency signal route from the radiating element to the capacitive sensing unit. In this way, the present invention prevents the capacitive sensing unit from affecting radiation efficiency of the antennas, avoids malfunction, increases the sensing distance of the capacitive sensing unit, and more importantly, only one antenna needs to be designed for various communication systems having similar frequency bands. Therefore, design and manufacturing costs can be reduced, and device components can be easily managed.

Figure 12:
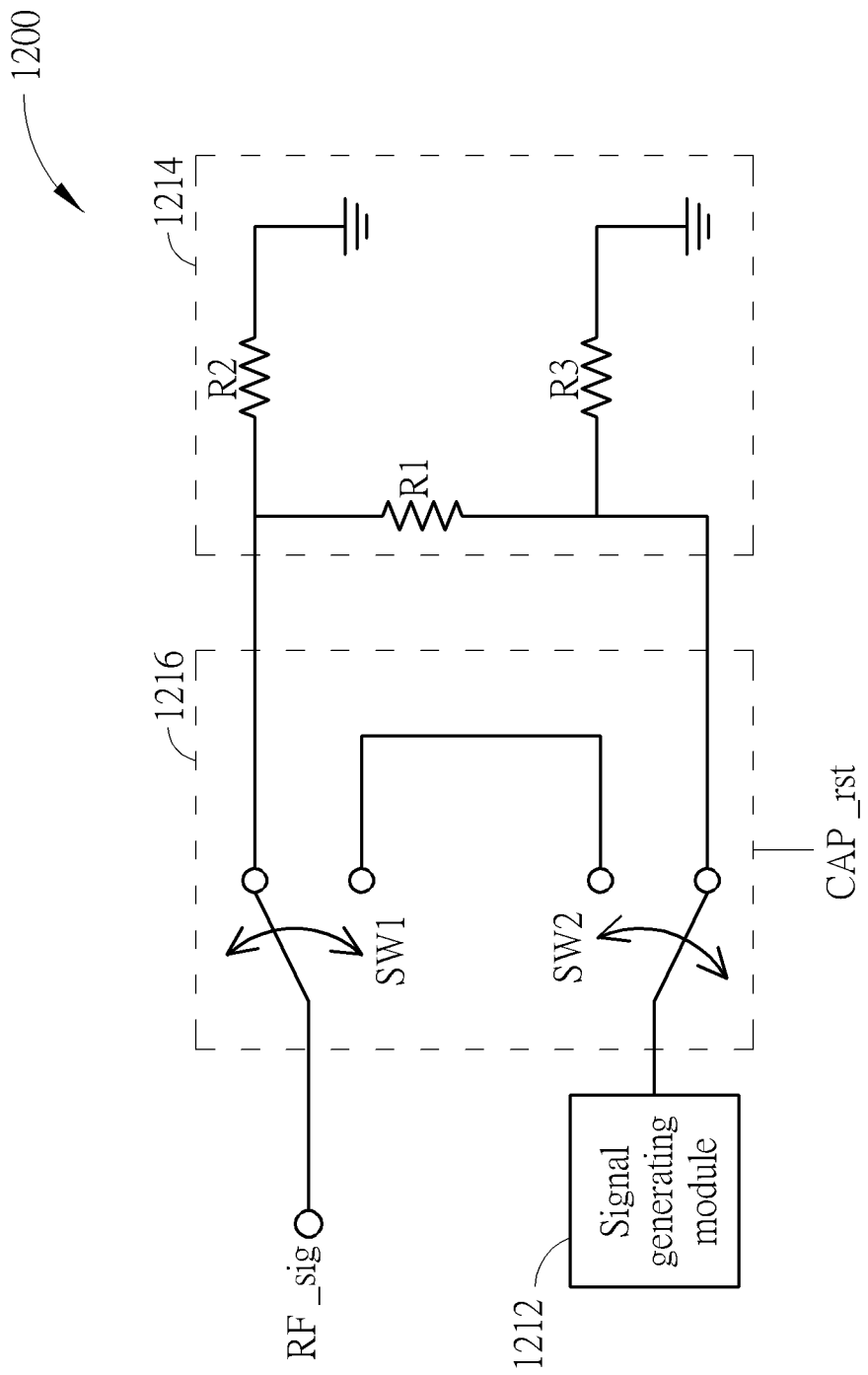
FIGS. 12 and 13 are schematic diagrams of an RF signal processing device according to different embodiments of the present invention.

The operation of the RF signal processing device 100 or the RF signal processing device 900 is not restricted to a specific rule, as long as the power of the RF signal RF_sig can be adjusted according to the sensing result CAP_rst. More precisely, the power of the RF signal RF_sig shall be reduced when the sensing result CAP_rst indicates that a human body is approaching. For example, please refer to FIG. 12, which is a schematic diagram of an RF signal processing device 1200 according to an embodiment of the present invention. The RF signal processing device 1200 is an embodiment of the RF signal processing device 100 in FIG. 1 or the RF signal processing device 900 in FIG. 9. The RF signal processing device 1200 includes a signal generating module 1212, an attenuating module 1214 and a switching module 1216. The signal generating module 1212 is utilized for generating the RF signal RF_sig, and the attenuating module 1214, composed of resistors R1 to R3, is utilized for attenuating a signal power. The switching module 1216 is coupled to the signal feed-in unit (e.g. 110 or 910), the capacitive sensing unit (e.g. 114 or 914), the signal generating module 1212 and the attenuating module 1214, and contains switches SW1 and SW2. The switching module 1216 is utilized for connecting the attenuating module 1214 between the signal generating module 1212 and the signal feed-in unit when the sensing result CAP_rst of the capacitive sensing unit indicates that the environment capacitance within the specific range is larger than a default value, such that the RF signal outputted by the signal generating module 1212 is transmitted to the attenuating module 1214 before fed in to the signal feed-in unit for attenuating the signal power. On the other hand, the switching module 1216 conducts the signal generating module 1212 to the signal feed-in unit directly when the sensing result CAP_rst of the capacitive sensing unit indicates the environment capacitance within the specific range is not larger than a default value, such that the RF signal output by the signal generating module 1212 is transmitted to the signal feed-in unit directly. In this way, when the sensing result CAP_rst indicates that a human body is approaching, the RF signal processing device 1200 can decrease the power of the RF signal RF_sig to avoid affecting human body. On the contrary, when the sensing result CAP_rst indicates that there is no human body approaching, the RF signal processing device 1200 keeps the power of the RF signal RF_sig to keep antenna efficiency.

Figure 13:
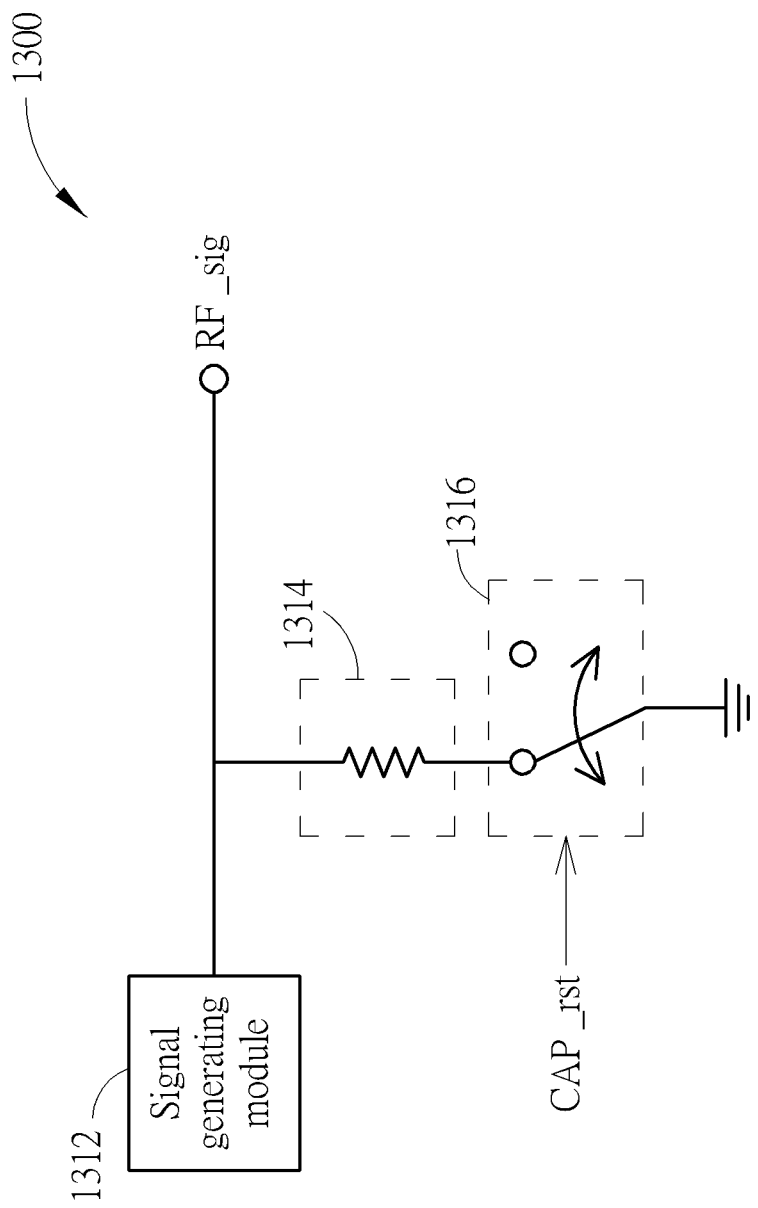

Furthermore, please refer to FIG. 13, which is a schematic diagram of an RF signal processing device 1300 according to an embodiment of the present invention. The RF signal processing device 1300 is an embodiment of the RF signal processing device 100 in FIG. 1 or the RF signal processing device 900 in FIG. 9. The RF signal processing device 1300 includes a signal generating module 1312, a resistor 1314, and a switching module 1316. The signal generating module 1312 is utilized for generating the RF signal RF_sig, and is electrically connected the resistor 1314 and the signal feed-in unit (e.g. 110 or 910). The switching module 1316 is coupled to a system ground terminal, the capacitive sensing unit (e.g. 114 or 914), and the resistor 1314. The switching module 1316 is utilized for conducting the connection between the resistor 1314 and the system ground terminal when the sensing result CAP_rst of the capacitive sensing unit indicates that the environment capacitance within the specific range is larger than a default value, to drain a part of the RF signal output by the signal generating module 1312 into the system ground terminal, so as to decrease the power of the RF signal transmitted to the signal feed-in unit. On the contrary, the switching module 1316 cuts off the connection between the resistor 1314 and the system ground terminal when the sensing result CAP_rst of the capacitive sensing unit indicates that the environment capacitance within the specific range is not larger than a default value, such that the RF signal output by the signal generating module 1312 is transmitted to the signal feed-in unit directly, to keep the power of the RF signal RF_sig transmitted to the signal feed-in unit. In this way, when the sensing result CAP_rst indicates that a human body is approaching, the RF signal processing device 1300 can decrease the power of the RF signal RF_sig to avoid affecting human body. On the contrary, when the sensing result CAP_rst indicates there is no human body approaching, the RF signal processing device 1300 keeps the power of the RF signal RF_sig to keep antenna efficiency.

In addition, as to power supply methods of the switching modules 1216 and 1316 in the RF signal processing devices 1200 and 1300, dc power can be embedded in the RF signal RF_sig, extracted by a filter or drain circuit and supplied to the switching modules 1216 and 1316. Such skill is well known in the art.

On the other hand, in the aforementioned embodiments, the capacitive sensing units 114, 214, 314, 414, 514, 614, 714, 814, 914, 1014, and 1114 are utilized for sensing an environment capacitance of a specific field. Implementations thereof are not limited and can be appropriately adjusted according to system demands. For example, please refer to FIG. 14, which is a schematic diagram of a capacitive sensing unit 1400 according to an embodiment of the present invention. The capacitive sensing unit 1400 can replace or implement the capacitive sensing units 114, 214, 314, 414, 514, 614, 714, 814, 914, 1014 and 1114 in the aforementioned embodiments, and includes a determination unit 1402 and a capacitor C_INT. The determination unit 1402 is connected to the radiating element (e.g. 108, 208, 308, 408, 508, 608, 708, 808, 908, 1008 and 1108) through a pin PIN_sensing, for detecting whether a voltage of the pin PIN_sensing reaches a threshold voltage value V_STEP, and determining whether an external object is approaching according to whether the number of times required by charging the pin PIN_sensing to the threshold voltage value V_STEP exceeds N_CHARGE+N_BARRIER, so as to output the sensing result CAP_rst. The threshold voltage value V_STEP represents a threshold voltage value that the pin PIN_Sensing is completely charged by the capacitor C_INT. The number of charge N_CHARGE represents the number of times required by the capacitor C_INT charging the pin PIN_Sensing to the threshold voltage V_STEP when no external object is approaching. The number of barrier charge N_BARRIER is to avoid erroneous actions caused by slight environment variations. Therefore, when the number of charge exceeds N_CHARGE+N_BARRIER, whether an external object is approaching can be correctly determined.

In detail, the route from the pin PIN_Sensing (or the radiating element) to the ground terminal can be equivalent to a capacitor C_Sensing to the ground terminal. Note that, the capacitor C_Sensing is an equivalent capacitor, which does not exist in real structures; however, the capacitor C_Sensing is still illustrated in FIG. 14, in order to describe the operating principle of the capacitive sensing unit 1400. If there is no external object approaching, the number of times required by the capacitor C_INT charging the capacitor C_Sensing to the threshold voltage value V_STEP is N_CHARGE. In other words, the number of charge N_CHARGE is a basis for determining whether an external object is approaching, while the number of barrier charge N_BARRIER further takes slight environment variation into consideration. Therefore, when an external object is approaching and makes the number of times required by the capacitor C_INT charging the pin PIN_Sensing to the threshold voltage value V_STEP to exceed N_CHARGE+N_BARRIER, the determining unit 1402 can correctly determine an event of an external object approaching, so as to output corresponding sensing result CAP_rst (e.g. logic 1). On the contrary, when there is no external object approaching, or when an external object is approaching but the number of times required by the capacitor C_INT charging the pin PIN_Sensing to the threshold voltage value V_STEP does not exceed N_CHARGE+ N_BARRIER, indicating that the event of an external object approaching is not triggered, the determining unit 1402 outputs the corresponding sensing result CAP_rst (e.g. logic 0).

Figure 14:
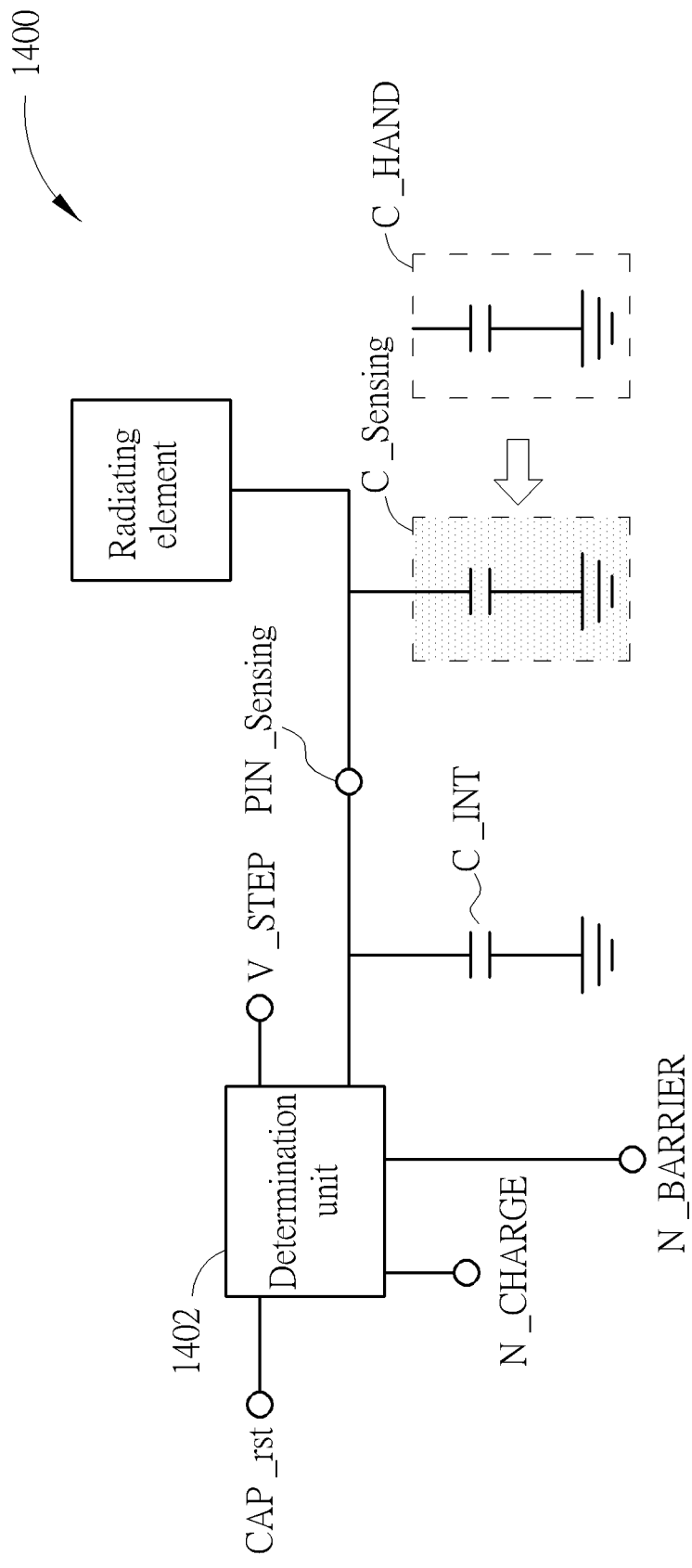
FIG. 14 is a capacitive sensing unit according to an embodiment of the present invention.

More specifically, as illustrated in FIG. 14, a relation between a human body or hand and the ground can be equivalent to a capacitor C_HAND to the ground, so that when the human body or hand is approaching the capacitive sensing unit, the capacitance of the pin PIN_Sensing increases (i.e. to C_sensing+C_HAND) because of parallel connection of the capacitors, which increases the number of times required by the capacitor C_INT charging the pin PIN_Sensing to the threshold voltage value V_STEP. Accordingly, when the number of charge exceeds N_CHARGE+N_BARRIER, an event of approach of an external object can be correctly determined, and corresponding information (e.g. logic 1) is shown in the sensing result CAP_rst, indicating that a human body or hand is detected as approaching.

Note that, FIG. 14 illustrates an embodiment of the capacitive sensing unit in the present invention. Those skilled in the art can make appropriate adjustments corresponding to system demands, and is not limited herein.

In the prior art, in order to reduce interference and keep antenna efficiency, a proximity sensor is utilized for sensing capacitance variation caused by approach of a human body, so as to determine an event of approach of a human body. However, the proximity sensor includes a receiver or a sensor containing metal materials, which affects antenna efficiency, and requires additional cost to adjust the antenna. In comparison, the present invention utilizes existing radiating element instead of adding receiver or sensor to perform environment capacitance sensing. In addition, the present invention further utilizes a DC blocking element to block a dc signal flowing from the radiating element to the signal feed-in unit and utilizes a high-frequency blocking element to block an RF signal flowing from the radiating element to the capacitive sensing unit, which also increases a sensing area of the sensing unit. As a result, the present invention can save the space required for disposing a capacitive sensing unit, prevent from affecting antenna efficiency, and increase a sensing distance of the sensing unit. Moreover, only one antenna needs to be designed for various communication systems having similar frequency bands, hence design and manufacturing costs can be reduced, and device components can be easily managed.

In conclusion, the present invention utilizes the radiating element of the antenna to sense environment capacitance within a specific range and adjust power of RF signals accordingly, and therefore, radiation efficiency of antenna can be maintained. Furthermore, only one antenna needs to be designed for different communication systems having similar frequency bands, which is beneficial for design and manufacturing cost reductions and device component management. Thus, the present invention helps to design an RF device with small size, high efficiency, high environmental adaptability, and low interference features.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio-frequency (RF) device for a wireless communication system, the RF device comprising:
   a grounding unit, for providing grounding;
   an antenna, comprising:
   a radiating element;
   a signal feed-in unit, for transmitting an RF signal to the radiating element, to emit the RF signal via the radiating element; and
   a ground terminal, coupled to the grounding unit;
   a capacitive sensing unit, for sensing an environment capacitance within a specific range via the radiating element;
   a first direct-current (DC) blocking element, electrically connected between the ground terminal of the antenna and the grounding unit, for cutting off a direct-current signal route from the ground terminal to the grounding unit;
   a second DC blocking element, electrically connected between the radiating element and the signal feed-in unit, for cutting off a direct-current signal route from the radiating element to the signal feed-in unit; and a high-frequency blocking element, electrically connected between the radiating element and the capacitive sensing unit, for cutting off a high-frequency signal route from the radiating element to the capacitive sensing unit.

2. The RF device of claim 1, wherein the high-frequency blocking element is an inductor, a connecting element or a composite element.

3. The RF device of claim 1, wherein the first DC blocking element and the second DC blocking element are capacitors, couplers or composite elements.

4. The RF device of claim 1, wherein the antenna is a planer inverted F antenna, a dipole antenna, a folded dipole antenna, a loop antenna, a microstrip antenna or a coupling antenna.

5. The RF device of claim 1, wherein an effective capacitance value of the second DC blocking element is between 3.3 pF to 56 pF.

6. The RF device of claim 1, wherein an effective capacitance value of the first DC blocking element is between 3.3 pF to 33 pF.

7. The RF device of claim 1, wherein the radiating element comprises a first sub-radiating element and a second sub-radiating element, and the antenna further comprises an inductor, electrically connected between the first sub-radiating element and the second sub-radiating element.

8. The RF device of claim 7, wherein an effective inductance value of the inductor is larger than 33 nH.

9. A wireless communication device, comprising:
a radio-frequency (RF) signal processing device, for generating an RF signal, and adjusting power of the RF signal according to a sensing result; and
the RF device as claimed in claim 1.

10. The wireless communication device of claim 9, wherein the RF signal processing device comprises:
a signal generating module, for generating the RF signal;
a attenuating module for attenuating signal power; and
a switching module, coupled to the signal feed-in unit, the capacitive sensing unit, the signal generating module and the attenuating module, for connecting the attenuating module to a position between the signal generating module and the signal feed-in unit when the sensing result of the capacitive sensing unit indicates the environment capacitance within the specific range is greater than a default value, such that the RF signal is transmitted to the signal feed-in unit after power of the RF signal is attenuated by the attenuating module.

11. The wireless communication device of claim 9, wherein the RF signal processing device comprises:
a signal generating module, coupled to the signal feed-in unit, for generating the RF signal;
a resistor, coupled between the signal generating module and the signal feed-in unit; and
a switching module, coupled to the capacitive sensing unit, the resistor and a ground terminal, for conducting a connection between the resistor and the ground terminal when the sensing result of the capacitive sensing unit indicates that the environment capacitance within the specific range is greater than a default value, to drain a part of the RF signal into the ground terminal.

12. A radio-frequency (RF) device for a wireless communication device, the RF device comprising:
an antenna, comprising:
a radiating element; and
a signal feed-in unit, for transmitting an RF signal to the radiating element, to emit the RF signal via the radiating element;
a capacitive sensing unit, for sensing an environment capacitance within a specific range via the radiating element;
a direct-current (DC) blocking element, electrically connected between the radiating element and the signal feed-in unit, for cutting off a direct-current signal route from the radiating element to the signal feed-in unit; and
a high-frequency blocking element, electrically connected between the radiating element and the capacitive sensing unit, for cutting off a high-frequency signal route from the radiating element to the capacitive sensing unit;
wherein the signal feed-in unit or the capacitive sensing unit cuts off a direct-current signal route from the radiating element to a ground terminal.

13. The RF device of claim 12, wherein the high-frequency blocking element is an inductor, a connecting element or a composite element.

14. The RF device of claim 12, wherein the DC blocking element is a capacitor, a coupler or a composite element.

15. The RF device of claim 12, wherein the antenna is a monopole antenna or a patch antenna.

16. A wireless communication device, comprising:
a radio-frequency (RF) signal processing device, for generating an RF signal and adjusting power of the RF signal according to a sensing result; and
the RF device as claimed in claim 12.

17. The wireless communication device of claim 16, wherein the RF signal processing device comprises:
a signal generating module, for generating the RF signal;
a attenuating module, for attenuating signal power; and
a switching module, coupled to the signal feed-in unit, the capacitive sensing unit, the signal generating module and the attenuating module, for connecting the attenuating module to a position between the signal generating module and the signal feed-in unit when the sensing result of the capacitive sensing unit indicates that the environment capacitance within the specific range is greater than a default value, such that the RF signal is transmitted to the signal feed-in unit after power of the RF signal is attenuated by the attenuating module.

18. The wireless communication device of claim 16, wherein the RF signal processing device comprises:
a signal generating module, coupled to the signal feed-in unit, for generating the RF signal;
a resistor, coupled between the signal generating module and the signal feed-in unit; and
a switching module, coupled to the capacitive sensing unit, the resistor and a ground terminal, for conducting a connection between the resistor and the ground terminal when the sensing result of the capacitive sensing unit indicates that the environment capacitance within the specific range is greater than a default value, to drain a part of the RF signal into the ground terminal.

* * * * *